(12) United States Patent
Park

(10) Patent No.: US 11,983,047 B2
(45) Date of Patent: May 14, 2024

(54) FOLDABLE FLEXIBLE DISPLAY DEVICE AND ELECTRONIC DEVICE

(71) Applicant: Samsung Electronics Co., Ltd., Gyeonggi-do (KR)

(72) Inventor: Daehyeong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 17/678,274

(22) Filed: Feb. 23, 2022

(65) Prior Publication Data

US 2022/0221914 A1  Jul. 14, 2022

Related U.S. Application Data

(63) Continuation of application No. PCT/KR2021/017544, filed on Nov. 25, 2021.

(30) Foreign Application Priority Data

Jan. 13, 2021 (KR) .......................... 10-2021-0004474

(51) Int. Cl.
*G06F 1/16* (2006.01)

(52) U.S. Cl.
CPC .......... *G06F 1/1681* (2013.01); *G06F 1/1616* (2013.01); *G06F 1/1624* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 9,115,750 B2 | 8/2015 | Park | |
| 10,257,331 B2 | 4/2019 | Lin et al. | |
| 10,761,574 B1 | 9/2020 | Hsu et al. | |
| 10,824,197 B1 * | 11/2020 | Hsu | ........................ G06F 1/1641 |
| 10,845,850 B1 | 11/2020 | Kang et al. | |

(Continued)

FOREIGN PATENT DOCUMENTS

| | | |
|---|---|---|
| CN | 111698355 A | 9/2020 |
| JP | 2020-159429 A | 10/2020 |

(Continued)

OTHER PUBLICATIONS

International Search Report dated Feb. 28, 2022.
European Search Report dated Feb. 27, 2024.

*Primary Examiner* — Lisa Lea-Edmonds
(74) *Attorney, Agent, or Firm* — Cha & Reiter, LLC

(57) ABSTRACT

An electronic device, and flexible display for the same, are disclosed. The electronic device includes the flexible display having a first and second region, a first and second housing supporting the two regions of the display, a hinge enabling rotation of the first and second housing. The hinge includes an axis shaft providing a rotational axis, first to fourth sliding cams including a first to fourth cam noses, a cam body including first to fourth rotation cams and first to fourth rotation cam noses, a first elastic member disposed between the first and second sliding cams, a second elastic member disposed between the third and fourth sliding cams, wherein the first to fourth cam noses are disposed on different axes extending parallel to the rotational axis of the axis shaft.

20 Claims, 21 Drawing Sheets

(56) References Cited

U.S. PATENT DOCUMENTS

| | | | |
|---|---|---|---|
| 11,048,296 B2* | 6/2021 | Hsu | G06F 1/1652 |
| 11,243,578 B2* | 2/2022 | Torres | G06F 1/1616 |
| 11,336,759 B2* | 5/2022 | Liao | H04M 1/022 |
| 11,616,866 B2* | 3/2023 | Park | G06F 1/1681 |
| | | | 361/679.27 |
| 11,644,874 B2* | 5/2023 | Kuramochi | H04M 1/022 |
| | | | 361/679.27 |
| 11,726,530 B2* | 8/2023 | Kang | H04M 1/022 |
| | | | 361/679.27 |
| 11,846,997 B2* | 12/2023 | Liao | G06F 1/1616 |
| 2021/0034116 A1* | 2/2021 | Torres | G06F 1/1616 |
| 2021/0034117 A1* | 2/2021 | Torres | G06F 1/1616 |
| 2021/0250431 A1* | 8/2021 | Park | G06F 1/1681 |
| 2022/0011827 A1* | 1/2022 | Kim | G06F 1/1616 |
| 2022/0137675 A1* | 5/2022 | Kuramochi | G06F 1/1641 |
| | | | 361/679.27 |
| 2022/0147114 A1* | 5/2022 | Torres | G09F 9/301 |
| 2022/0221914 A1* | 7/2022 | Park | H04M 1/02 |
| 2023/0176629 A1* | 6/2023 | Cho | G06F 1/1652 |
| | | | 361/679.27 |
| 2023/0403347 A1* | 12/2023 | Liu | H04M 1/022 |

FOREIGN PATENT DOCUMENTS

| | | |
|---|---|---|
| KR | 20-2011-0006426 U | 6/2011 |
| KR | 10-1804576 B1 | 12/2017 |
| KR | 10-2020-0067799 A | 6/2020 |
| KR | 10-2020-0101251 A | 8/2020 |
| KR | 10-2200430 B1 | 1/2021 |

* cited by examiner

FOLDABLE FLEXIBLE DISPLAY DEVICE AND ELECTRONIC DEVICE

CROSS-REFERENCE TO RELATED APPLICATION(S)

This application is a Continuation of International Application No. PCT/KR2021/017544, filed on Nov. 25, 2021, which claims priority under 35 U.S.C. § 119 to Korean Patent Application No. 10-2021-0004474, filed on Jan. 13, 2021, in the Korean Intellectual Property Office, the disclosure of which is incorporated by reference herein in its entirety.

BACKGROUND

1. Field

The disclosure relates to display devices, and, more particular, to a foldable flexible display device.

2. Description of Related Art

A portable electronic device such as a smartphone may provide various functions, such as a call function, video playback, and Internet access and search, etc. based on various types of applications. Users often prefer to use the above-described various functions on larger displays. However, as the size of the screen is increased, portability of the electronic device may deteriorate. Accordingly, a screen size can be increased without hampering portability by using a foldable structure for the display.

SUMMARY

A foldable electronic device may include a display, housings, and hinges. The display may be foldable along an axis thereof. The housings may surround a periphery of the display, and an electronic component for driving the display may be disposed within the housings. The hinges may be arranged between the housings to support a first sub-housing and a second sub-housing, rotatable relative to one another, to support configurations of the display, such as being unfolded to 180 degrees to form a plane, or folded to 0 (zero) degrees to close the flexible display.

According to an embodiment of the disclosure, in a foldable electronic device equipped with a flexible display, a tactile sense of detent may be implemented in mounting portions, and a free stop may be implemented in both flat sections using cam structures that engage with each other within a hinge structure. However, when the free stop is implemented, and two flat surfaces within a central section of the cam are engaged, a reaction force of the flexible display gradually increases, which may render it more difficult to implement the free stop.

Therefore, an aspect of the disclosure provides a foldable flexible display device and an electronic device capable of variable configurations that are stable fixed, by variously setting an angle between a first housing and a second housing.

Additional aspects of the disclosure will be set forth in part in the description which follows and, in part, will be obvious from the description, or may be learned by practice of the disclosure.

In accordance with an aspect of the disclosure, an electronic device is disclosed, including: a flexible display including a first region and a second region, a first housing supporting the first region, a second housing supporting the second region, and a hinge structure connecting the first housing to the second housing, wherein the hinge structure includes: an axis shaft forming a rotational axis, a sliding cam slidably coupled to the axis shaft, and including a first sliding cam in which a first sliding cam nose is formed, a second sliding cam in which a second sliding cam nose is formed, a third sliding cam in which a third sliding cam nose is formed, and a fourth sliding cam in which a fourth sliding cam nose is formed, a cam body including a first rotation cam including a first rotation cam nose engaged with the first sliding cam, a second rotation cam including a second rotation cam nose engaged with the second sliding cam and a third rotation cam nose engaged with the third sliding, and a third rotation cam including a fourth rotation cam nose engaged with the fourth sliding cam, and elastic members including a first elastic member disposed between the first sliding cam and the second sliding cam, and a second elastic member disposed between the third sliding cam and the fourth sliding cam, wherein the first rotation cam nose, the second rotation cam nose, the third rotation cam nose, and the fourth rotation cam nose are disposed on different imaginary lines extending parallel to the rotational axis of the axis shaft.

The first sliding cam nose, the second sliding cam nose, the third sliding cam nose, and the fourth sliding cam nose may be disposed on a same imaginary line.

The first elastic member may apply an elastic force to the first sliding cam and the second sliding cam, along a direction in which the first sliding cam is movable away from the second sliding cam, and the second elastic member may apply an elastic force to the third sliding cam and the fourth sliding cam, along a direction in which the third sliding cam is movable away from the fourth sliding cam.

The cam body may be rotatable together with the axis shaft.

When the first housing and the second housing are disposed at a first angle relative to one another, the first rotation cam may be configured to receive a rotational force in a first direction by the first elastic member and the first sliding cam, and the third rotation cam may be configured to receive a rotational force in a second direction opposite to the first direction by the second elastic member and the third sliding cam.

When the first housing and the second housing are disposed at a second angle relative to one another, the second rotation cam may be configured to receive a rotational force in the second direction by the first elastic member and the second sliding cam, and the third rotation cam may be configured to receive a rotational force in the first direction by the second elastic member and the third sliding cam.

When the first housing and the second housing are disposed at a third angle relative to one another, the second rotation cam may be configured to receive a rotational force in the first direction by the first elastic member and the second sliding cam, and the fourth rotation cam may be configured to receive a rotational force in the second direction by the second elastic member and the fourth sliding cam.

The first angle may be greater than the second angle, and the second angle may be greater than the third angle.

When the first housing and the second housing may be rotated to an angle between the first angle and the second angle, the first sliding cam, the second sliding cam, and the first elastic member may be moved along a direction in which the axis shaft extends.

When the first housing and the second housing may be rotated to an angle between the second angle and the third angle, the third sliding cam, the fourth sliding cam, and the second elastic member may be moved along a direction in which the axis shaft extends.

When the first housing and the second housing may be disposed in an unfolded configuration, the first rotation cam nose may be supported on the first sliding cam nose by the first elastic member, in a direction along which the first housing and the second housing unfold relative to one another.

When the first housing and the second housing may be disposed in an folded configuration, the fourth rotation cam nose may be supported on the fourth sliding cam nose by the second elastic member, in a direction along which the first housing and the second housing fold together.

In accordance with another aspect of the disclosure, a foldable flexible display device is disclosed, including: a first housing, a second housing, a flexible display disposed on the first housing and the second housing, and a hinge structure provided to rotatably couple the first housing to the second housing, wherein the hinge structure includes: an axis shaft forming a rotational axis, a sliding cam slidably coupled to the axis shaft, and including a first sliding cam in which a first sliding cam nose is formed, a second sliding cam in which a second sliding cam nose is formed, a third sliding cam in which a third sliding cam nose is formed, and a fourth sliding cam in which a fourth sliding cam nose is formed, a cam body including a first rotation cam engaged with the first sliding cam and including a first rotation cam nose, a second rotation cam engaged with the second sliding cam and the third sliding cam, and including a second rotation cam nose and a third rotation cam nose, and a third rotation cam engaged with the fourth sliding cam and including a fourth rotation cam nose, wherein the first sliding cam nose, the second sliding cam nose, the third sliding cam nose, and the fourth sliding cam nose are disposed on a same imaginary line, and wherein the first rotation cam nose, the second rotation cam nose, the third rotation cam nose, and the fourth rotation cam nose are disposed on different imaginary lines extending parallel to the rotational axis of the axis shaft.

When an angle between the first housing and the second housing may be a first angle, the first rotation cam may be supported in a first direction by the first sliding cam, and the third rotation cam may be supported in a second direction opposite to the first direction by the third sliding cam.

When an angle between the first housing and the second housing may be a second angle, the second rotation cam may be supported in the second direction by the second sliding cam, and the third rotation cam may be supported in the first direction by the third sliding cam.

When an angle between the first housing and the second housing a third angle, the second rotation cam may be supported in the first direction by the second sliding cam, and the fourth rotation cam may be supported in the second direction by the fourth sliding cam.

The hinge structure may include a first elastic member disposed between the first sliding cam and the second sliding cam, and a second elastic member disposed between the third sliding cam and the fourth sliding cam.

When the first housing and the second housing may be disposed in an unfolded configuration, the first rotation cam may be supported by the first sliding cam, along a direction in which the first housing and the second housing unfold relative to one another.

When the first housing and the second housing may be disposed in a folded configuration, the fourth rotation cam may be supported by the fourth sliding cam, along a direction, in which the first housing and the second housing fold together.

The second rotation cam nose may be formed on a first surface of the second rotation cam facing the second sliding cam, and the third rotation cam nose may be formed on a second surface of the second rotation cam opposite to the first surface.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
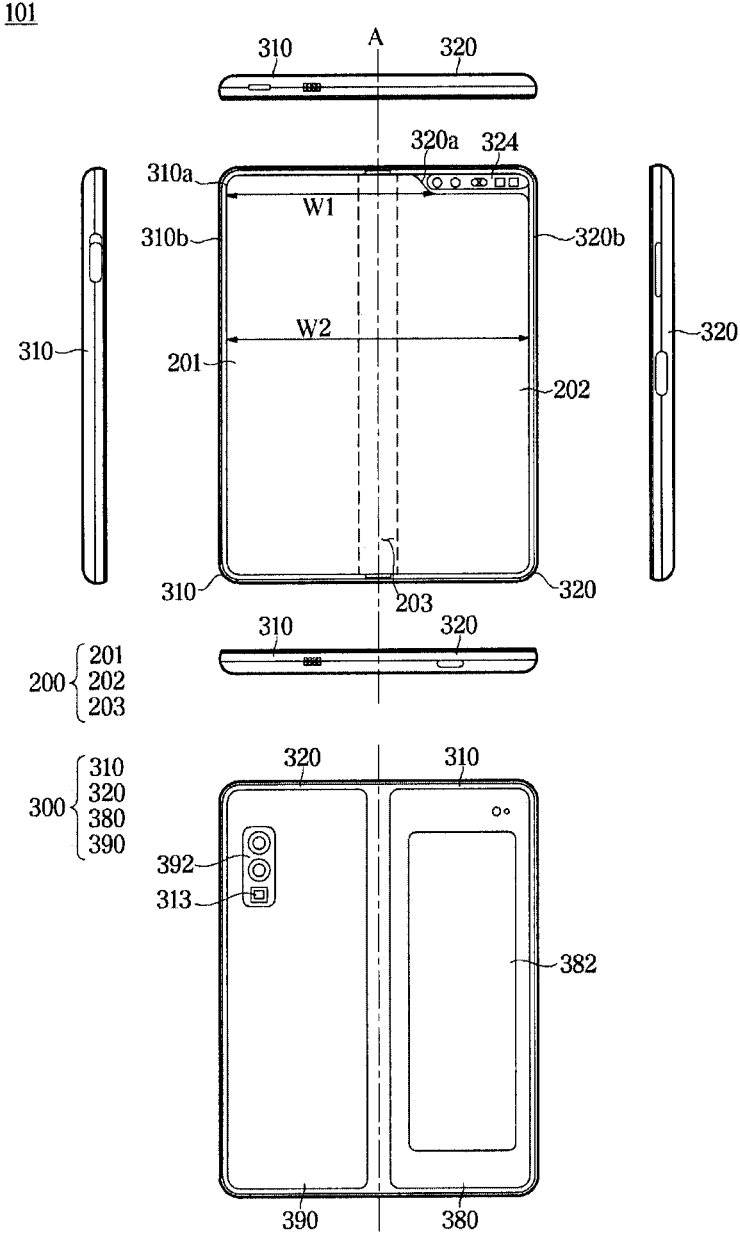
FIG. 1 is a view illustrating an unfolded state of an electronic device according to certain embodiments of the disclosure.

The electronic device according to certain embodiments disclosed in the disclosure may have various types of devices. For example, the electronic device may include a portable communication device (e.g., a smart phone), a computer device, a portable multimedia device, a portable medical device, a camera, a wearable device, or a home appliance device. The electronic device according to the embodiment of the disclosure is not limited to the above-described devices.

The certain embodiments and the terms used therein are not intended to limit the technology disclosed herein to specific forms, and the disclosure should be understood to include various modifications, equivalents, and/or alternatives to the corresponding embodiments. In describing the drawings, similar reference numerals may be used to designate similar constituent elements. A singular expression may include a plural expression unless they are definitely different in a context. The expressions "A or B," "at least one of A or/and B," or "one or more of A or/and B," and the like used herein may include any and all combinations of one or more of the associated listed items. Herein, the expressions "a first", "a second", "the first", "the second", etc., may simply be used to distinguish an element from other elements, but is not limited to another aspect (importance or order) of elements. When an element (e.g., a first element) is referred to as being "(functionally or communicatively) coupled," or "connected" to another element (e.g., a second element), the first element may be connected to the second element, directly (e.g., wired), wirelessly, or through a third component.

As used herein, the term "module" may refer to a unit that includes one or a combination of two or more of hardware, software, or firmware. A "module" may be interchangeably used with terms such as, for example, unit, logic, logical block, component, or circuit. The module may be a minimum unit or part of an integrated component. The module may be a minimum unit or part of performing one or more functions. The "module" can be implemented mechanically or electronically. For example, a "module" may be implemented in the form of an application-specific integrated circuit (ASIC).

Certain embodiments of the present document may be implemented as software (e.g., a program) including one or more instructions stored in a storage medium (e.g., an internal memory or an external memory) readable by a machine (e.g., the electronic device 101). For example, a processor (not shown) of a device (e.g., the electronic device 101) may call at least one instruction among one or more instructions stored in a storage medium and execute the instruction. This makes it possible for the device to be operated to perform at least one function according to the called at least one instruction. The one or more instructions may include code generated by a compiler or code executable by an interpreter. Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., PlayStore™). In the case of online distribution, at least a portion of the computer program product (e.g., downloadable app) may be temporarily stored or created temporarily in a device-readable storage medium such as the manufacturer's server, the application store's server, or the relay server's memory.

According to certain embodiments, each component (e.g., a module or a program) of the above-described components may include a singular or a plurality of entities, and some of the plurality of entities may be separately arranged in other components. According to certain embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. Operations performed by a module, a program module, or other elements according to certain embodiments of the disclosure may be executed sequentially, in parallel, repeatedly, or in a heuristic method. Also, a portion of operations may be executed in different sequences, omitted, or other operations may be added.

Figure 2:
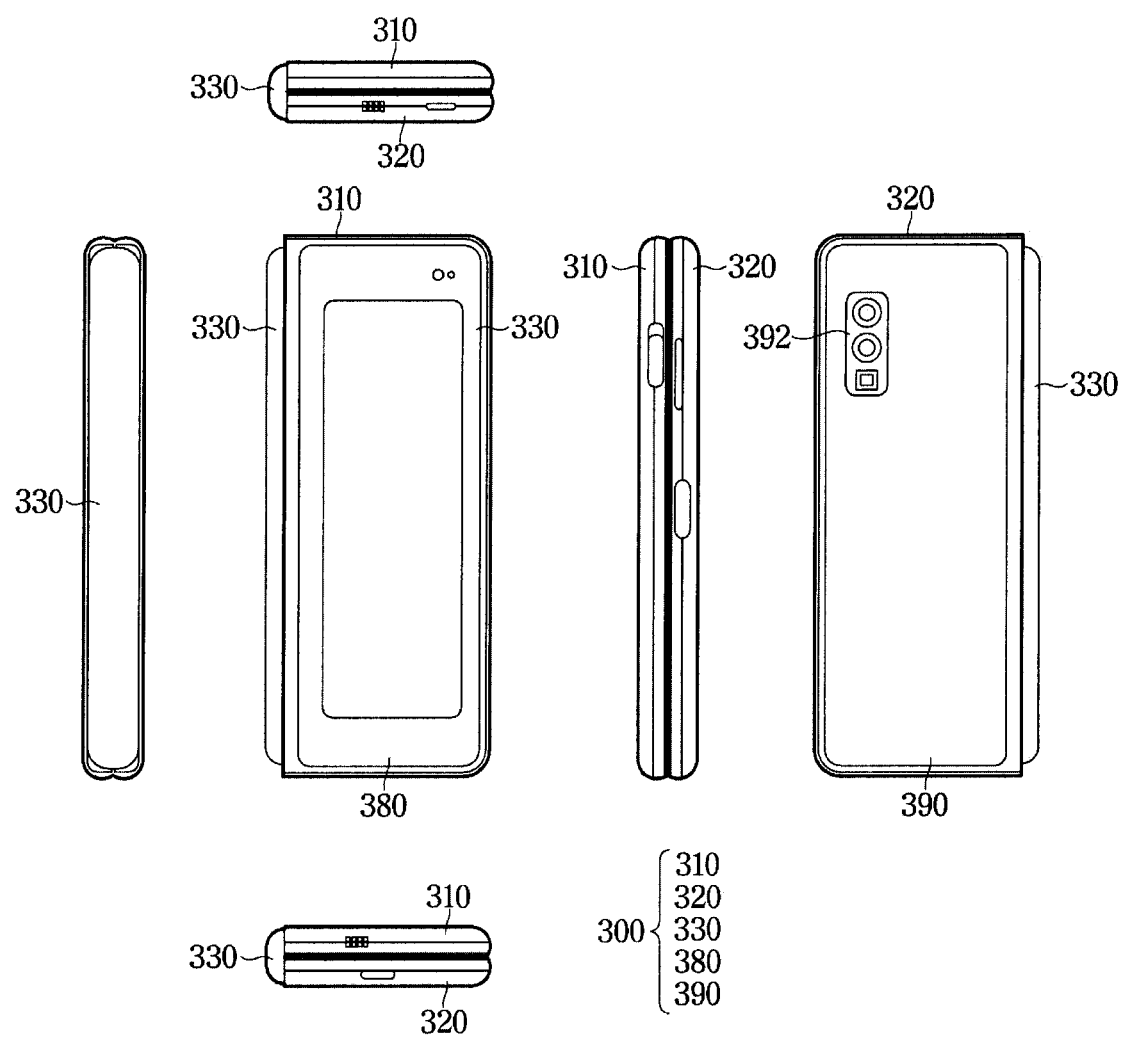
FIG. 2 is a view illustrating a folded state of the electronic device according to certain embodiments of the disclosure.

FIG. 1 is a view illustrating an unfolded state of an electronic device according to certain embodiments of the disclosure. FIG. 2 is a view illustrating a folded state of the electronic device according to certain embodiments of the disclosure.

Referring to FIGS. 1 and 2, according to an embodiment, an electronic device 101 may include a foldable housing 300, a hinge cover (e.g., a hinge cover 330 of FIG. 2) provided to cover a foldable portion of the foldable housing 300, and a flexible or foldable display 200 (hereinafter referred to as "display" 200) arranged in a space formed by the foldable housing 300. According to an embodiment, a surface on which the display 200 is arranged is defined as a front surface of the electronic device 101. In addition, an opposite surface of the front surface is defined as a rear surface of the electronic device 101. In addition, a surface surrounding a space between the front surface and the rear surface is defined as a side surface of the electronic device 101.

Figure 3:
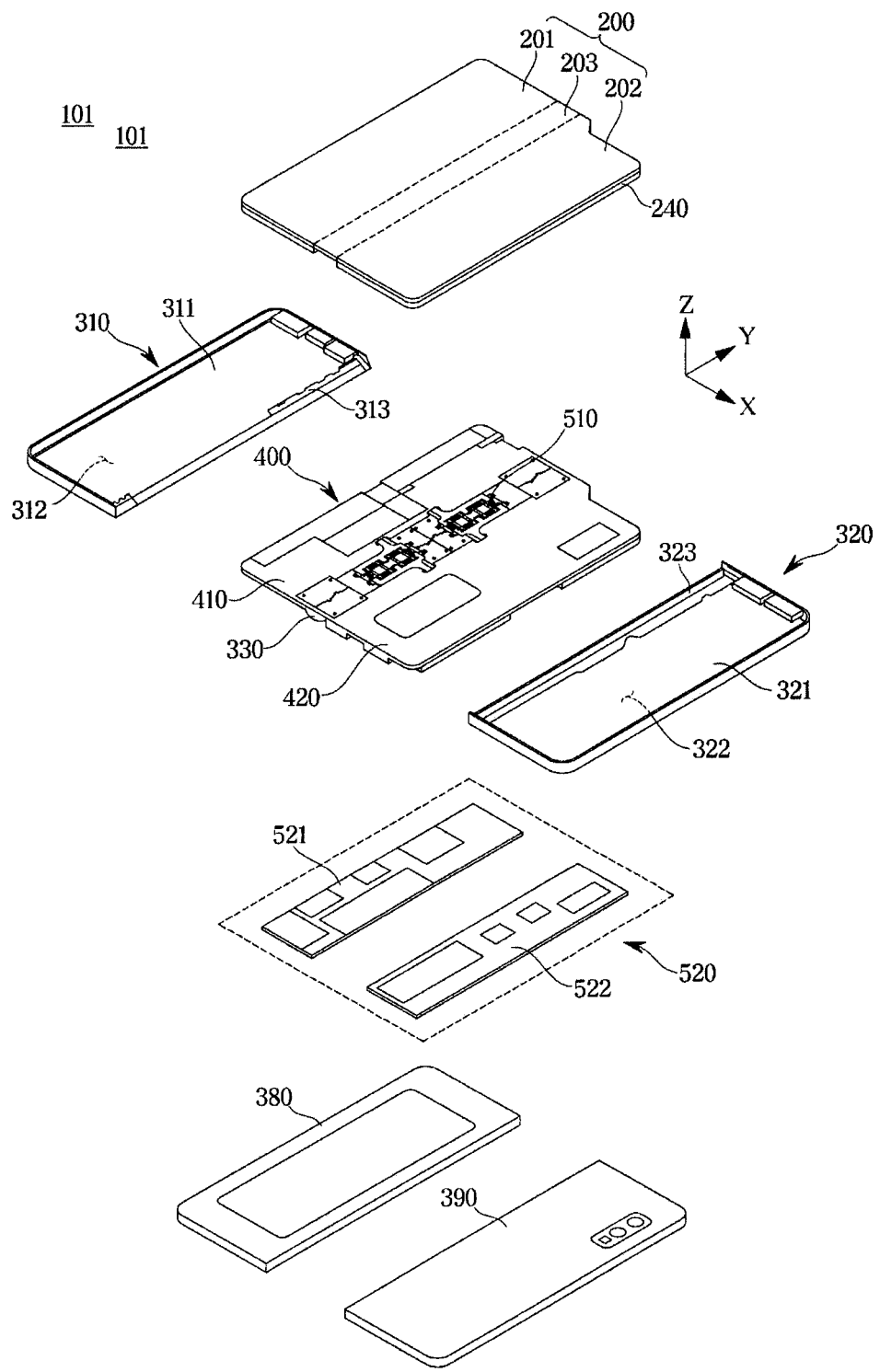
FIG. 3 is an exploded perspective view of the electronic device according to certain embodiments of the disclosure.

According to certain embodiments, the foldable housing 300 may include a first housing structure 310, a second housing structure 320 including a sensor region 324, a first rear cover 380, a second rear cover 390, and a hinge structure (e.g., a hinge structure 500 of FIG. 3). The foldable housing 300 of the electronic device 101 is not limited to the shape and coupling shown in FIGS. 1 and 2, and may be implemented by other shapes or other combination and/or coupling of components. For example, in another embodiment, the first housing structure 310 and the first rear cover 380 may be integrally formed, and the second housing structure 320 and the second rear cover 390 may be integrally formed.

According to certain embodiments, the first housing structure 310 may be connected to the hinge structure (e.g., the hinge structure 500 of FIG. 3), and include a first surface facing a first direction, and a second surface facing a second direction opposite the first direction. The second housing structure 320 may be connected to the hinge structure 500 and include a third surface facing a third direction and a fourth surface facing a fourth direction opposite to the third direction. The second housing structure 320 may be rotatable relative to the first housing structure 310 about the hinge structure 500. Accordingly, the electronic device 101 may be variable in form, and include both folded and unfolded configurations (e.g., folded and unfolded "state"). The first surface of the electronic device 101 may be disposed to face the third surface in the folded state of the electronic device 101, and the third direction may be the same as the first direction in the unfolded state of the electronic device 101.

According to certain embodiments, the first housing structure 310 and the second housing structure 320 may be arranged on opposite sides about a folding axis (A-axis), and may have an overall symmetrical shape with respect to the folding axis A. As will be described later, an angle or a distance between the first housing structure 310 and the second housing structure 320 may vary depending on whether the electronic device 101 is in the folded state, or the unfolded state, or an intermediate state that is partially unfolded. According to an embodiment, the second housing structure 320 further includes a sensor region 324 in which various sensors are arranged, unlike the first housing structure 310, but in other region, the second housing structure 320 may have a shape symmetrical to the first housing structure 310.

According to certain embodiments, as shown in FIG. 1, the first housing structure 310 and the second housing structure 320 may together form a recess for accommodating the display 200. According to an embodiment, because of the sensor region 324, the recess may have at least two different widths set in a direction perpendicular to the folding axis A.

According to an embodiment, the recess may define a first width w1 between a first portion 310*a*, which is parallel to the folding axis A of the first housing structure 310, and a first portion 320*a* formed at a periphery of the sensor region 324 of the second housing structure 320. The recess may define a second width w2 between a second portion 310*b* of the first housing structure 310 and a second portion 320*b* of the second housing structure 320 that does not correspond to the sensor region 324 and is parallel to the folding axis A. In this case, the second width w2 may be formed to be greater than the first width w1. As another example, the first portion 310*a* of the first housing structure 310 and the first portion 320*a* of the second housing structure 320 having an asymmetrical shape may have the first width w1 of the recess. The second portion 310*b* of the first housing structure 310 and the second portion 320*b* of the second housing structure 320 having a symmetrical shape may have the second width w2 of the recess. According to an embodiment, a distance from the folding axis A to the first portion 320*a* may be different from a distance from the folding axis A the second portion 320*b* of the second housing structure 320. The width of the recess is not limited to the illustrated example. In another embodiment, the recess may have a plurality of widths due to the shape of the sensor region 324 or due to a portion, which has the asymmetric shape, of the first housing structure 310 and the second housing structure 320.

According to certain embodiments, at least a portion of the first housing structure 310 and the second housing structure 320 may be formed of a metallic material or a non-metallic material having a rigidity sufficient to support the display 200. The at least a portion formed of the metal material may provide a ground plane of the electronic device 101 and be electrically connected to a ground line formed on a printed circuit board (e.g., a printed circuit board 520 of FIG. 3).

According to certain embodiments, the sensor region 324 may be formed to have a predetermined region adjacent to one corner of the second housing structure 320. However, an arrangement, shape, and size of the sensor region 324 are not limited to the illustrated example. For example, in another embodiment, the sensor region 324 may be provided at another corner of the second housing structure 320 or provided at any region between an upper corner and a lower corner. In an embodiment, components for performing various functions and embedded in the electronic device 101 may be exposed on the front surface of the device 101 through the sensor region 324 or through one or more openings provided in the sensor region 324. In certain embodiments, the components may include various types of sensors. The sensor may include at least one of a front camera, a receiver, or a proximity sensor.

According to certain embodiments, the first rear cover 380 may be arranged on one side of the folding axis on the rear surface of the electronic device 101. For example, the first rear cover 380 may include a substantially rectangular periphery, and the periphery may be surrounded by the housing structure 310. Similarly, the second rear cover 390 may be arranged on the other side of the folding axis on the rear surface of the electronic device 101, and a periphery thereof may be surrounded by the second housing structure 320.

According to certain embodiments, the first rear cover 380 and the second rear cover 390 may have a substantially symmetrical shape with respect to the folding axis (A-axis). However, the first rear cover 380 and the second rear cover 390 do are not absolutely required to have symmetrical shapes, and in another embodiment, the electronic device 101 may include the first rear cover 380 and the second rear cover 390 formed in other various shapes. In another embodiment, the first rear cover 380 may be integrally formed with the first housing structure 310, and the second rear cover 390 may be integrally formed with the second housing structure 320.

According to certain embodiments, the first rear cover 380, the second rear cover 390, the first housing structure 310, and the second housing structure 320 may form a space in which various components (e.g., a printed circuit board, or a battery) may be disposed. According to an embodiment, one or more components may be arranged or visually exposed on the rear surface of the electronic device 101. For example, at least a portion of a sub-display may be visually exposed through a first rear region 382 of the first rear cover 380. In another embodiment, one or more components or sensors may be visually exposed through a second rear region 392 of the second rear cover 390. In certain embodiments, the sensor may include a proximity sensor and/or a rear camera.

According to certain embodiments, the front camera, which is exposed on the front surface of the electronic device 101 through one or more openings provided in the sensor region 324, or the rear camera, which is exposed through the second rear region 392 of the second rear cover 390 may include one or more lenses, an image sensor, and/or an image signal processor. A flash 313 may include a light emitting diode or a xenon lamp. In some embodiments, two or more lenses (infrared cameras, wide angle and telephoto lenses) and image sensors may be arranged on one side of the electronic device 101.

Referring to FIG. 2, the hinge cover 330 may be arranged between the first housing structure 310 and the second housing structure 320 to cover internal components (e.g., the hinge structure 500 of FIG. 3). According to an embodiment, the hinge cover 330 may be covered by a portion of the first housing structure 310 and the second housing structure 320 or exposed to the outside according to the state of the electronic device 101, such as the unfolded state (or flat state), the intermediate state and the folded state.

According to an embodiment, as shown in FIG. 1, when the electronic device 101 is configured in the unfolded state, the hinge cover 330 may be covered by the first housing structure 310 and the second housing structure 320 so as not to be exposed. As another example, as shown in FIG. 2, when the electronic device 101 is configured in the folded state (e.g., a fully folded state), the hinge cover 330 may be exposed to the outside through between the first housing structure 310 and the second housing structure 320. As another example, in response to the intermediate state in which the first housing structure 310 and the second housing structure 320 are folded to a certain angle between 0 degrees and 180 degrees, the hinge cover 330 may be partially exposed to the outside through between the first housing structure 310 and the second housing structure 320. However, in this case, the exposed region may be less than that of the fully folded state. In an embodiment, the hinge cover 330 may include a curved surface.

According to certain embodiments, the display 200 may be arranged in a space formed by the foldable housing 300. For example, the display 200 is seated on the recess formed by the foldable housing 300 and may form most of the front surface of the electronic device 101. Accordingly, the front surface of the electronic device 101 may include the display 200, and a partial region of the first housing structure 310 and a partial region of the second housing structure 320 adjacent to the display 200. In addition, the rear surface of the electronic device 101 may include the first rear cover 380, a partial region of the first housing structure 310 adjacent to the first rear cover 380, the second rear cover 390, and a partial region of the second housing structure 320 adjacent to the second rear cover 390.

According to certain embodiments, the display 200 may include at least a region that is deformed into a flat surface or a curved surface. According to an embodiment, the display 200 may include a folding region 203, a first region 201 arranged on one side (e.g., the left side of the folding region 203 shown in FIG. 1) with respect to the folding region 203, and a second region 202 arranged on the other side (e.g., the right side of the folding region 203 shown in FIG. 1) with respect to the folding region 203.

However, the division of the region of the display 200 shown in FIG. 1 is shown merely as an example, and the display 200 may be divided into a plurality (e.g., two or four or more) regions according to a structure or function. For example, in the embodiment illustrated in FIG. 1, the region of the display 200 may be divided by the folding region 203 extending parallel to y-axis or the folding axis (A-axis), but in another embodiment, the display region 200 may be divided based on another folding region (e.g., a folding region parallel to x-axis) or another folding axis (e.g., a folding axis parallel to x-axis). According to an embodiment, the display 200 may be coupled to or arranged adjacent to a touch sensing circuit, a pressure sensor may be configured to measure an intensity (pressure) of a touch, and/or a digitizer may also be provided to detect a magnetic field type stylus pen.

According to certain embodiments, the first region 201 and the second region 202 may have an overall symmetrical shape with respect to the folding region 203. However, the second region 202 may include a notch that is cut according to the presence of the sensor region 324, unlike the first region 201, but in other regions, the second region 202 may have a shape symmetrical with the first region 201. In other words, the first region 201 and the second region 202 may include a portion having a shape symmetrical to each other and a portion having a shape asymmetrical to each other.

Hereinafter operations of the first housing structure 310 and the second housing structure 320 and each region of the display 200 according to the state (e.g., the folded state, the unfolded state, or the intermediate state) of the electronic device 101 will be described.

According to certain embodiments, when the electronic device 101 is set in the unfolded state (e.g., FIG. 1), the first housing structure 310 and the second housing structure 320 may form an angle of 180 degrees and be arranged to face a same direction. A surface of the first region 201 and a surface of the second region 202 of the display 200 may form 180 degrees and may face the same direction (e.g., the front direction of the electronic device). The folding region 203 may form the same plane as the first region 201 and the second region 202.

According to certain embodiments, when the electronic device 101 is set in the folded state of the electronic device 101 (e.g., FIG. 2), the first housing structure 310 and the second housing structure 320 may be arranged to face each other. The surface of the first region 201 and the surface of the second region 202 of the display 200 may face each other while forming a relatively small angle (e.g., between 0 and 10 degrees). The folding region 203 may be formed of a curved surface having a predetermined curvature in at least a portion thereof.

According to certain embodiments, when the electronic device 101 is set in the intermediate state (or folded state) of the electronic device 101, the first housing structure 310 and the second housing structure 320 may be arranged at a certain interim angle between 180 degrees and 0 degrees. The surface of the first region 201 and the surface of the second region 202 of the display 200 may form an angle greater than that in the folded state and less than that in the unfolded state. The folding region 203 may be formed of a curved surface having a predetermined curvature in at least a portion thereof, and the curvature in this case may be less than that in the folded state.

FIG. 3 is an exploded perspective view of the electronic device according to certain embodiments of the disclosure.

Referring to FIG. 3, in certain embodiments, the electronic device 101 may include the foldable housing 300, the display 200, and a substrate portion 520. The foldable housing may include the first housing structure 310, the second housing structure 320, a bracket assembly 400, the first rear cover 380, the second rear cover 390, and the hinge structure 500.

According to certain embodiments, the display 200 may include a display panel (e.g., a flexible display panel) and one or more plates or layers (e.g., a support plate 240) on which the display panel is mounted. In an embodiment, the support plate 240 may be arranged between the display panel and the bracket assembly 400. An adhesive structure (not shown) may be positioned between the support plate 240 and the bracket assembly 400 to bond the support plate 240 and the bracket assembly 400.

According to certain embodiments, the bracket assembly 400 may include a first support plate 410 and a second support plate 420. The hinge structure 500 may be arranged between the first support plate 410 and the second support plate 420, and the hinge cover 330 that is provided to cover the hinge structure 500 when the hinge structure 500 is viewed from the outside may be disposed between the first support plate 410 and the second support plate 420. As another example, a printed circuit board (e.g., a flexible printed circuit board (FPC)) may be arranged to cross the first support plate 410 and the second support plate 420.

According to certain embodiments, the substrate unit 520 may include a first main circuit board 521 arranged on the first support plate 410 side and a second main circuit board 522 arranged on the second support plate 420 side. The first main circuit board 521 and the second main circuit board 522 may be arranged inside a space formed by the bracket assembly 400, the first housing structure 310, the second housing structure 320, the first rear cover 380 and the second rear cover 390. Components for implementing various functions of the electronic device 101 may be mounted on the first main circuit board 521 and the second main circuit board 522.

According to certain embodiments, the first housing structure 310 and the second housing structure 320 may be coupled to opposite sides of the bracket assembly 400 in response to coupling the display 200 to the bracket assembly 400. For example, the first housing structure 310 and the second housing structure 320 may slide from opposite sides of the bracket assembly 400 so as to be coupled to the bracket assembly 400.

According to an embodiment, the first housing structure 310 may include a first surface 311, and a second surface 312 facing in a direction opposite to the first surface 311, and the second housing structure 320 may include a third surface 321, and a fourth surface 322 facing in a direction opposite to the third surface 321.

According to an embodiment, the first housing structure 310 may include a first rotation support surface 313, and the second housing structure 320 may include a second rotation support surface 323 corresponding to the first rotation support surface 313. The first rotation support surface 313 and the second rotation support surface 323 may include a curved surface corresponding to the curved surface included in the hinge cover 330.

According to an embodiment, in response to the unfolded state of the electronic device 101 (e.g., the electronic device of FIG. 1), the first rotation support surface 313 and the second rotation support surface 323 may cover the hinge cover 330 to prevent the hinge cover 330 from being exposed to the rear surface of the electronic device 101 or to allow the hinge cover 330 to be minimally exposed. As another example, in response to the folded state of the electronic device 101 (e.g., the electronic device of FIG. 2), the first rotation support surface 313 and the second rotation support surface 323 may be rotated along the curved surface included in the hinge cover 330 so as to allow the hinge cover 330 to be maximally exposed to the rear surface of the electronic device 101.

Figure 4:
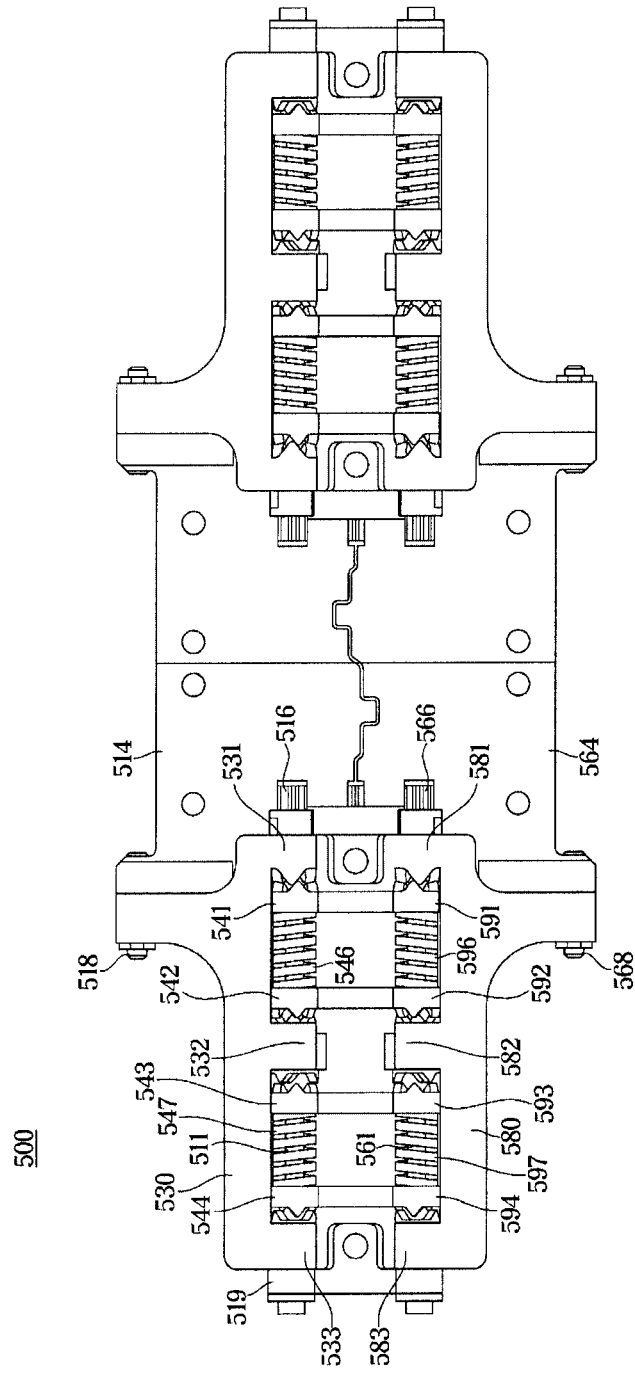
FIG. 4 is a view illustrating a front surface of a hinge structure provided in the electronic device according to certain embodiments of the disclosure.
Figure 5:
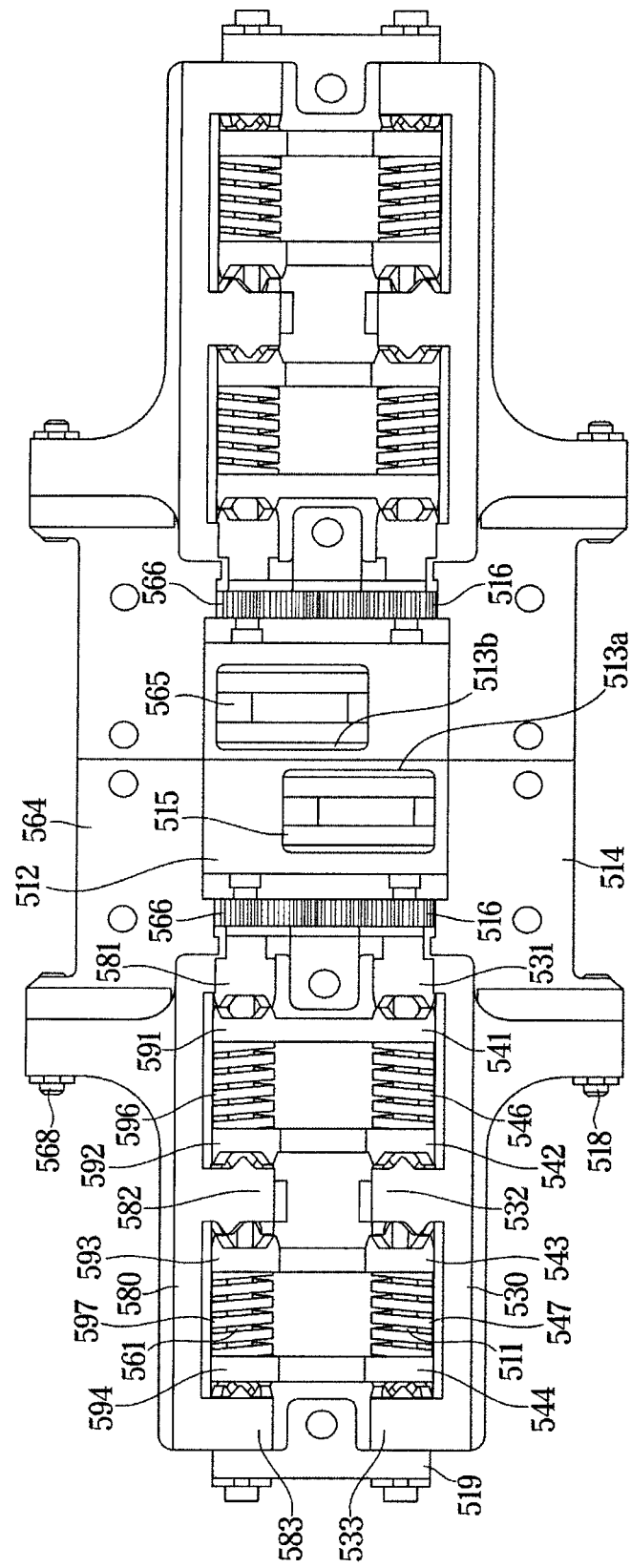
FIG. 5 is a view illustrating a rear surface of the hinge structure provided in the electronic device according to certain embodiments of the disclosure.
Figure 6:
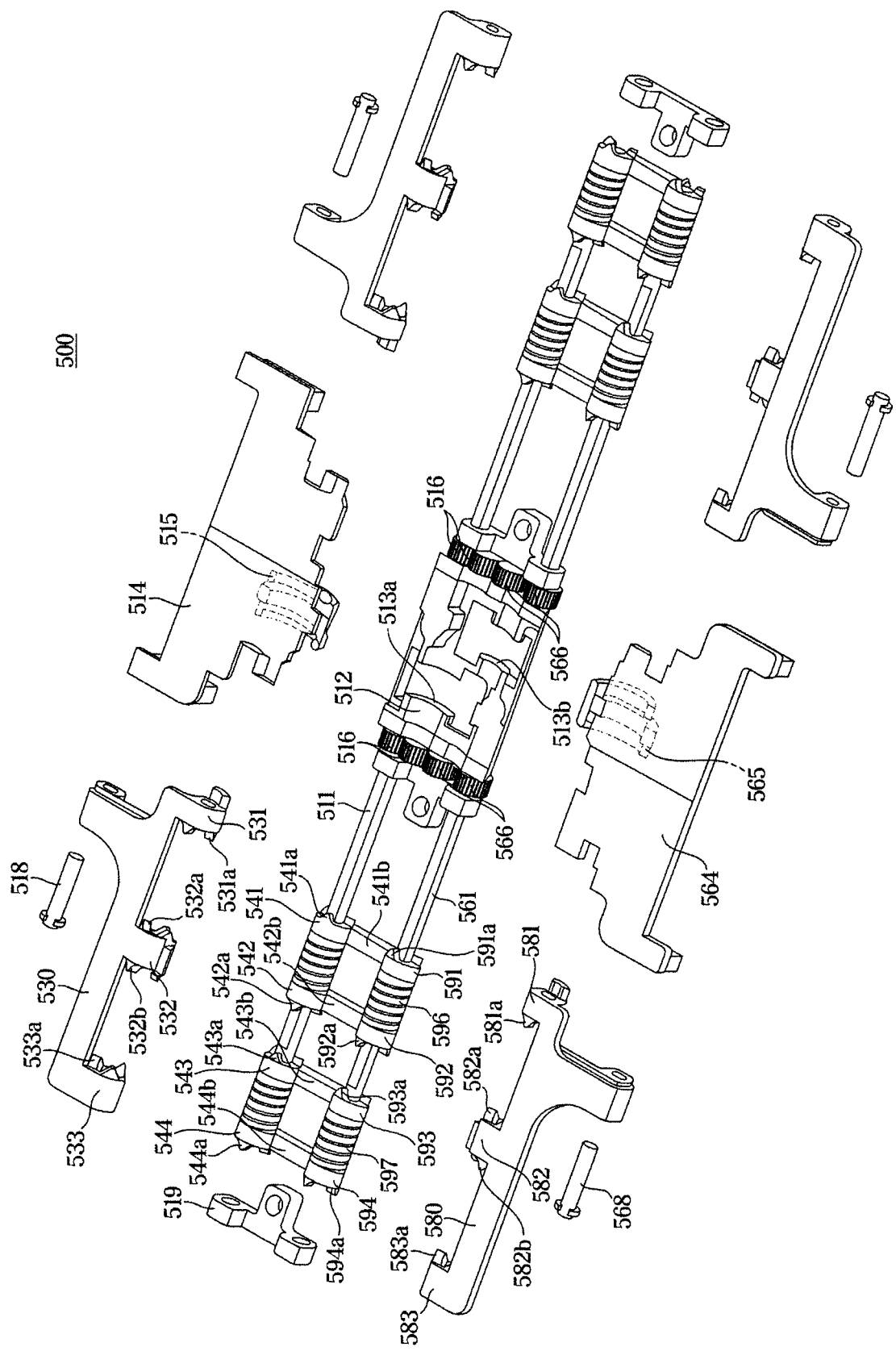
FIG. 6 is a view illustrating an example of an exploded perspective view of some components of the hinge structure provided in the electronic device according to certain embodiments of the disclosure.

FIG. 4 is a view illustrating a front surface of a hinge structure provided in the electronic device according to certain embodiments of the disclosure. FIG. 5 is a view illustrating a rear surface of the hinge structure provided in the electronic device according to certain embodiments of the disclosure. FIG. 6 is a view illustrating an example of an exploded perspective view of some components of the hinge structure provided in the electronic device according to certain embodiments of the disclosure.

Referring to FIGS. 4 to 6, the electronic device 101 may include the hinge structure 500 which operably connects the first housing 310 to the second housing 320.

The hinge structure 500 may include axis shafts 511 and 561. The axis shafts 511 and 561 may include a first axis shaft 511 and a second axis shaft 561. The first axis shaft 511 may form a rotation axis of the first housing 310. The second axis shaft 561 may form a rotation axis of the second housing 320.

The hinge structure 500 may include a first housing coupling portion 514 coupled to the first housing 310 and a second housing coupling portion 564 coupled to the second housing 320. The first housing 310 may be coupled to the first housing coupling portion 514. Accordingly, the first housing 310 may be rotatable with respect to the rotation axis formed by the first axis shaft 511. The second housing 320 may be coupled to the second housing coupling portion 564. Accordingly, the second housing 320 may be rotatable with respect to the rotation axis formed by the second axis shaft 561.

The first housing coupling portion 514 may include a first coupling portion guide 515. The first coupling portion guide 515 may have a substantially semicircular shape. The second housing coupling portion 564 may include a second coupling portion guide 565. The second coupling portion guide 565 may have a substantially semicircular shape.

The hinge structure 500 may include a hinge body 512 coupled to the first axis shaft 511 and the second axis shaft 561. The hinge body 512 may include a first body guide 513a coupled to the first coupling portion guide 515 to guide movement of the first coupling portion guide 515, and a second body guide 513b coupled to the second coupling portion guide 565 to guide movement of the second coupling portion guide 565.

The hinge structure 500 may include shaft gears 516 and 566 linking the first axis shaft 511 and the second axis shaft 561. The shaft gears 516 and 566 may connect the first axis shaft 511 to the second axis shaft 561, and thus, when the first axis shaft 511 is rotated in a first direction, the second axis shaft 561 may be rotated in a second direction opposite to the first direction. The first axis shaft 511 may be connected to the first shaft gear 516, and the second axis shaft 561 may be connected to the second shaft gear 566. FIG. 6 illustrates that two first shaft gears 516 and two second shaft gears 566 are provided on opposite sides of the hinge body 512, respectively, but if the first axis shaft 511 and the second shaft gear 566 are provided to be rotated in directions opposite to each other, it is understood that the number of shaft gears is not limited to the description provided herein.

The hinge structure 500 may include a shaft bracket 519 provided to rotatably support ends of the first axis shaft 511 and the second axis shaft 561. As the shaft bracket 519 is rotatably coupled to the first axis shaft 511 and the second axis shaft 561, it is possible to prevent the components coupled to the first axis shaft 511 and the second axis shaft 561 from being separated.

According to this configuration, during rotation of the first axis shaft 511 and the second axis shaft 561 of the hinge structure 500, the first housing 310 and the second housing 320 may be rotated.

Because the hinge structure 500 is provided such that the components interlocked with the first axis shaft 511 are approximately symmetrical with the components interlocked with the second axis shaft 561, for convenience of description, a configuration related to the first axis shaft 511 will be described in detail, and a configuration related to the second axis shaft 561 will be omitted but for brief descriptions thereof, in the interests of brevity. Further, components interlocked with the first axis shaft 511 are approximately symmetrical with the first housing coupling portion 514, and for convenience of description, components located on one side of the first housing coupling portion 514 will be described.

The hinge structure 500 may include sliding cams 541, 542, 543, and 544 rotatably and slidably coupled to the first axis shaft 511. The sliding cams 541, 542, 543, and 544 may include a first sliding cam 541, a second sliding cam 542, a third sliding cam 543, and a fourth sliding cam 544. The first sliding cam 541, the second sliding cam 542, the third sliding cam 543, and the fourth sliding cam 544 may be coupled to the axis shaft 511 not to be rotated but to be moved linearly along the axis shaft 511 in response to rotation of the axis shaft 511.

The hinge structure 500 may include sliding cams 591, 592, 593, and 594 rotatably and slidably coupled to the second axis shaft 561. The sliding cams 591, 592, 593, and 594 may include a fifth sliding cam 591, a sixth sliding cam 592, a seventh sliding cam 593, and an eighth sliding cam 594. The fifth sliding cam 591, the sixth sliding cam 592, the seventh sliding cam 593, and the eighth sliding cam 594 may correspond to the first sliding cam 541, the second sliding cam 542, the third sliding cam 543, and the fourth sliding cam 544, respectively.

The hinge structure 500 may include a first bridge 541b extending between the first sliding cam 541 and the fifth sliding cam 591. By the first bridge 541b, the first sliding cam 541 may slide without rotating even when the first axis shaft 511 is rotated, and the fifth sliding cam 591 may slide without rotating even when the second axis shaft 561 is rotated. The hinge structure 500 may include a second bridge 542b extending between the second sliding cam 542 and the sixth sliding cam 592. By the second bridge 542b, the second sliding cam 542 may slide without rotating even when the first axis shaft 511 is rotated, and the sixth sliding cam 592 may slide without rotating even when the second axis shaft 561 is rotated. The hinge structure 500 may include a third bridge 543b extending between the third sliding cam 543 and the seventh sliding cam 593. By the third bridge 543b, the third sliding cam 543 may slide without rotating even when the first axis shaft 511 is rotated, and the seventh sliding cam 593 may slide without rotating even when the second axis shaft 561 is rotated. The hinge structure 500 may include a fourth bridge 544b extending between the fourth sliding cam 544 and the eighth sliding cam 594. By the fourth bridge 544b, the fourth sliding cam 544 may slide without rotating even when the first axis shaft 511 is rotated, and the eighth sliding cam 594 may slide without rotating even when the second axis shaft 561 is rotated.

The first sliding cam 541 may be engaged with a first rotation cam 531, the second sliding cam 542 and the third sliding cam 543 may be engaged with a second rotation cam 532, and the fourth sliding cam 544 may be engaged with a third rotation cam 533.

The fifth sliding cam 591 may be engaged with a fourth rotation cam 581, the sixth sliding cam 592 and the seventh sliding cam 593 may be engaged with a fifth rotation cam 582, and the eighth sliding cam 594 may be engaged with a sixth rotation cam 583.

The first sliding cam 541 may include a first sliding cam nose 541a. The first sliding cam nose 541a may be a protruding portion of the first sliding cam 541, and is formed to engage and interact with a first rotation cam nose 531a of the first rotation cam 531. The second sliding cam 542 may include a second sliding cam nose 542a. The second sliding cam nose 542a may be a protruding portion of the second sliding cam 542, and is formed to engage and interact with a second rotation cam nose 532a of the second rotation cam 532. The third sliding cam 543 may include a third sliding cam nose 543a. The third sliding cam nose 543a may be a protruding portion of the third sliding cam 543, and is formed to engage and interact with a third rotation cam nose 532b of the second rotation cam 532. The fourth sliding cam 544 may include a fourth sliding cam nose 544a. The fourth sliding cam nose 544a may be a protruding portion of the fourth sliding cam 544, and is formed to engage and interact with a fourth rotation cam nose 533a of the third rotation cam 533.

The fifth sliding cam 591 may include a fifth sliding cam nose 591a. The sixth sliding cam 592 may include a sixth sliding cam nose 592a. The seventh sliding cam 593 may include a seventh sliding cam nose 593a. The eighth sliding cam 594 may include an eighth sliding cam nose 594a. The fifth sliding cam nose 591a, the sixth sliding cam nose 592a, the seventh sliding cam nose 593a, and the eighth sliding cam nose 594a may correspond to the first sliding cam nose 541a, the second sliding cam nose 542a, the third sliding cam nose 543a, and the fourth sliding cam nose 544a, respectively.

The first sliding cam nose 541a, the second sliding cam nose 542a, the third sliding cam nose 543a, and the fourth sliding cam nose 544a may be provided at an approximately same position along a radial direction from the first axis shaft 511. In other words, the first sliding cam nose 541a, the second sliding cam nose 542a, the third sliding cam nose 543a, and the fourth sliding cam nose 544a may be located on approximately a same (imaginary) line.

A first elastic member 546 may be provided between the first sliding cam 541 and the second sliding cam 542. The first elastic member 546 may be provided to apply an elastic force, along a direction in which the first sliding cam 541 and the second sliding cam 542 are movable away from each other, towards the first sliding cam 541 and the second sliding cam 542.

As mentioned above, in a state in which the first sliding cam 541 and the second sliding cam 542 are configured to share the first elastic member 546, it is possible to reduce a size thereof in comparison with a state in which an elastic member provided to elastically press the first sliding cam 541 toward the first rotation cam 531 and an elastic member provided to elastically press the second sliding cam 542 toward the second rotation cam 532 are respectively provided.

A second elastic member 547 may be provided between the third sliding cam 543 and the fourth sliding cam 544. The second elastic member 547 may be provided to apply an elastic force, along a direction in which the third sliding cam 543 and the fourth sliding cam 544 are movable away from each other, towards the third sliding cam 543 and the fourth sliding cam 544.

As mentioned above, in a state in which the third sliding cam 543 and the fourth sliding cam 544 are configured to share the second elastic member 547, it is possible to reduce a size thereof in comparison with a state in which an elastic member provided to elastically press the third sliding cam 543 toward the second rotation cam 532 and an elastic member provided to elastically press the fourth sliding cam 544 toward the third rotation cam 533 are respectively provided.

In other words, in the hinge structure 500 according to the embodiment of the disclosure, the first sliding cam 541 and the second sliding cam 542 are configured to share the first elastic member 546, and the third sliding cam 543 and the fourth sliding cam 544 are configured to share the second elastic member 547, and thus it is possible to reduce a size thereof in comparison with a state in which an elastic member for the first sliding cam 541, an elastic member for the second sliding cam 542, an elastic member for the third sliding cam 543 and an elastic member for the fourth sliding cam 544 are individually provided.

A third elastic member 596 may be provided between the fifth sliding cam 591 and the sixth sliding cam 592. The third elastic member 596 may be provided to apply an elastic force, along a direction in which the fifth sliding cam 591 and the sixth sliding cam 592 are movable away from each other, towards the fifth sliding cam 591 and the sixth sliding cam 592. The third elastic member 596 may correspond to the first elastic member 546.

A fourth elastic member 597 may be provided between the seventh sliding cam 593 and the eighth sliding cam 594. The fourth elastic member 597 may be provided to apply an elastic force, along a direction in which the seventh sliding cam 593 and the eighth sliding cam 594 are movable away from each other, towards the seventh sliding cam 593 and the eighth sliding cam 594. The fourth elastic member 597 may correspond to the second elastic member 547.

The hinge structure 500 may include a first cam body 530 coupled to the first housing coupling portion 514. The first cam body 530 may be coupled to the first housing coupling portion 514 by a first sliding shaft 518. The first sliding shaft 518 may be rotatably coupled to the first cam body 530. The first sliding shaft 518 may be slidably coupled to the first housing coupling portion 514. The first sliding shaft 518 may guide the first housing coupling portion 514 to allow the first housing coupling portion 514 to be rotated and moved in response to rotation of the first cam body 530. By the structure, when the first housing 310 and the second housing 320 are disposed in the folded configuration, the first region 201 and the second region 202 of the display 200 may be moved and rotated to face each other.

The hinge structure 500 may include a second cam body 580 coupled to the second housing coupling portion 564. The second cam body 580 may be coupled to the second housing coupling portion 564 by a second sliding shaft 568. The second cam body 580 and the second sliding shaft 568 may correspond to the first cam body 530 and the first sliding shaft 518.

The first cam body 530 may include the first rotation cam 531, the second rotation cam 532, and the third rotation cam 533. The first rotation cam 531, the second rotation cam 532, and the third rotation cam 533 may be fixed to the first axis shaft 511 to be rotatable together with the first axis shaft 511. The first rotation cam 531 may engage and interact with the first sliding cam 541. The second rotation cam 532 may engage and interact with the second sliding cam 542, and the third sliding cam 543. The third rotation cam 533 may engage and interact with the fourth sliding cam 544.

The second cam body 580 may include the fourth rotation cam 581, the fifth rotation cam 582, and the sixth rotation cam 583. The fourth rotation cam 581, the fifth rotation cam 582, and the sixth rotation cam 583 may correspond to the first rotation cam 531, the second rotation cam 532, and the third rotation cam 533, respectively.

The first rotation cam 531 may include the first rotation cam nose 531a. The first rotation cam nose 531a is a protruding portion of the first rotation cam 531, and is formed to engage and interact with the first sliding cam nose 541a of the first sliding cam 541. The second rotation cam 532 may include the second rotation cam nose 532a and the third rotation cam nose 532b. The second rotation cam nose 532a is a protruding portion of the second rotation cam 532, and is formed to engage and interact with the second sliding cam nose 542a of the second sliding cam 542. The third rotation cam nose 532b is a protruding portion of the second rotation cam 532, and is formed to engage and interact with the third sliding cam nose 543a of the third sliding cam 543. The second rotation cam 532 may be formed in such a way that the second rotation cam nose 532a is formed on one surface facing the second sliding cam 542, and the third rotation cam nose 532b is formed on one surface facing the third sliding cam 543. The third rotation cam nose 532b may be formed on a surface opposite to the surface on which the second rotation cam nose 532a is formed. The third rotation cam 533 may include the fourth sliding cam nose 533a. The fourth rotation cam nose 533a is a protruding portion of the third rotation cam 533, and is formed to engage and interact with the fourth sliding cam nose 544a of the fourth sliding cam 544.

The fourth rotation cam 581 may include the fifth rotation cam nose 581a. The fifth rotation cam 582 may include the sixth rotation cam nose 582a and the seventh rotation cam nose 582b. The sixth rotation cam 583 may include the eighth sliding cam nose 583a. The fifth rotation cam nose 581a, the sixth rotation cam nose 582a, the seventh rotation cam nose 582b, and the eighth rotation cam nose 583a may correspond to the first rotation cam nose 531a, the second rotation cam nose 532a, the third rotation cam nose 532b, and the fourth rotation cam nose 533a, respectively.

The first rotation cam 531 may be moved according to a relative position of the first rotation cam nose 531a with respect to the first sliding cam nose 541a of the first sliding cam 541. The second rotation cam 532 may be moved according to a relative position of the second rotation cam nose 532a with respect to the second sliding cam nose 542a of the second sliding cam 542 or according to a relative position of the third rotation cam nose 532b with respect to the third sliding cam nose 543a of the third sliding cam 543. The fourth rotation cam 581 may be moved according to a relative position of the fourth rotation cam nose 533a with respect to the fourth sliding cam nose 544a of the fourth sliding cam 544.

The first rotation cam nose 531a, the second rotation cam nose 532a, the third rotation cam nose 532b, and the fourth sliding cam nose 533a may be arranged at different positions from each other along the radial direction from the first axis shaft 511. In other words, the first rotation cam nose 531a, the second rotation cam nose 532a, the third rotation cam nose 532b, and the fourth rotation cam nose 533a may be located on different lines from each other.

Figure 7:
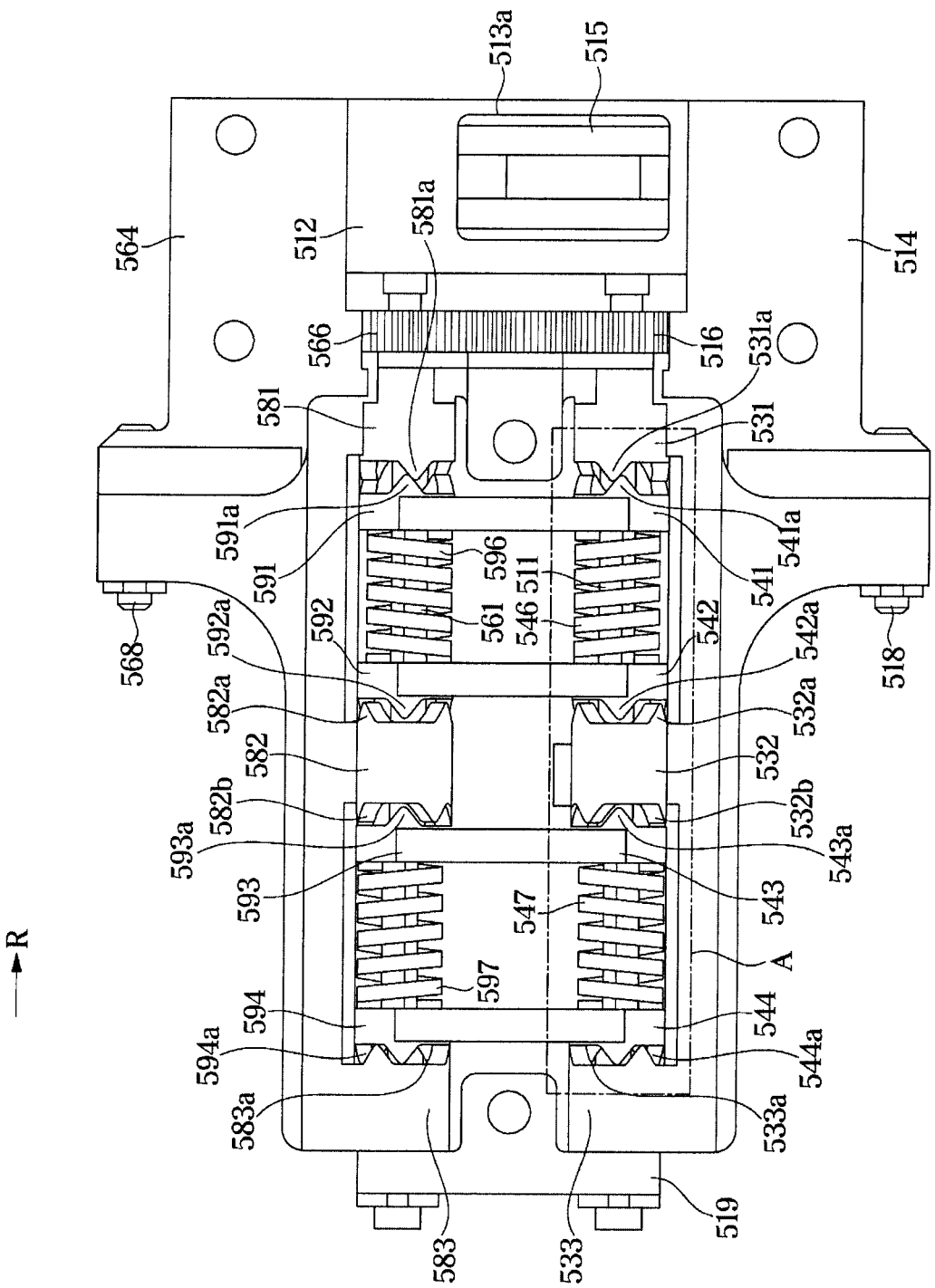
FIG. 7 is a rear view illustrating an unfolded state of the hinge structure provided in the electronic device according to certain embodiments of the disclosure.

Particularly, referring to FIG. 7, the first sliding cam nose 541a, the second sliding cam nose 542a, the third sliding cam nose 543a, and the fourth sliding cam nose 544a may be extended to be positioned on the same line. However, the first rotation cam nose 531a, the second rotation cam nose 532a, the third rotation cam nose 532b, and the fourth rotation cam nose 533a may be extended to be positioned on different lines from each other. That is, an imaginary line, on which the first rotation cam nose 531a is extended, is different from imaginary lines on which the second rotation cam nose 532a, the third rotation cam nose 532b, and the fourth rotation cam nose 533a are extended. An imaginary line, on which the second rotation cam nose 532a is extended, is different from imaginary lines on which the third rotation cam nose 532b, and the fourth rotation cam nose 533a are extended. An imaginary line, on which the third rotation cam nose 532b is extended, is different from an imaginary line on which the fourth rotation cam nose 533a is extended.

By the configuration, a position in which the first rotation cam nose 531a interacts with the first sliding cam nose 541a is different from a position in which the second rotation cam nose 532a interacts with the second sliding cam nose 542a, a position in which the third rotation cam nose 532b interacts with the third sliding cam nose 543a and a position in which the fourth rotation cam nose 533a interacts with the fourth sliding cam nose 544a. The position in which the second rotation cam nose 532a interacts with the second sliding cam nose 542a is different from the position in which the third rotation cam nose 532b interacts with the third sliding cam nose 543a and the position in which the fourth rotation cam nose 533a interacts with the fourth sliding cam nose 544a. The position in which the third rotation cam nose 532b interacts with the third sliding cam nose 543a is different from the position in which the fourth rotation cam nose 533a interacts with the fourth sliding cam nose 544a.

Accordingly, the hinge structure 500 may set various stopping angles between the first housing 310 and the second housing 320 by variously combining the position in which the first rotation cam nose 531a interacts with the first sliding cam nose 541a, the position in which the second rotation cam nose 532a interacts with the second sliding cam nose 542a, the position in which the third rotation cam nose 532b interacts with the third sliding cam nose 543a and the position in which the fourth rotation cam nose 533a interacts with the fourth sliding cam nose 544a. Hereinafter the configuration will be described in detail with reference to FIGS. 7 to 16.

Figure 8:
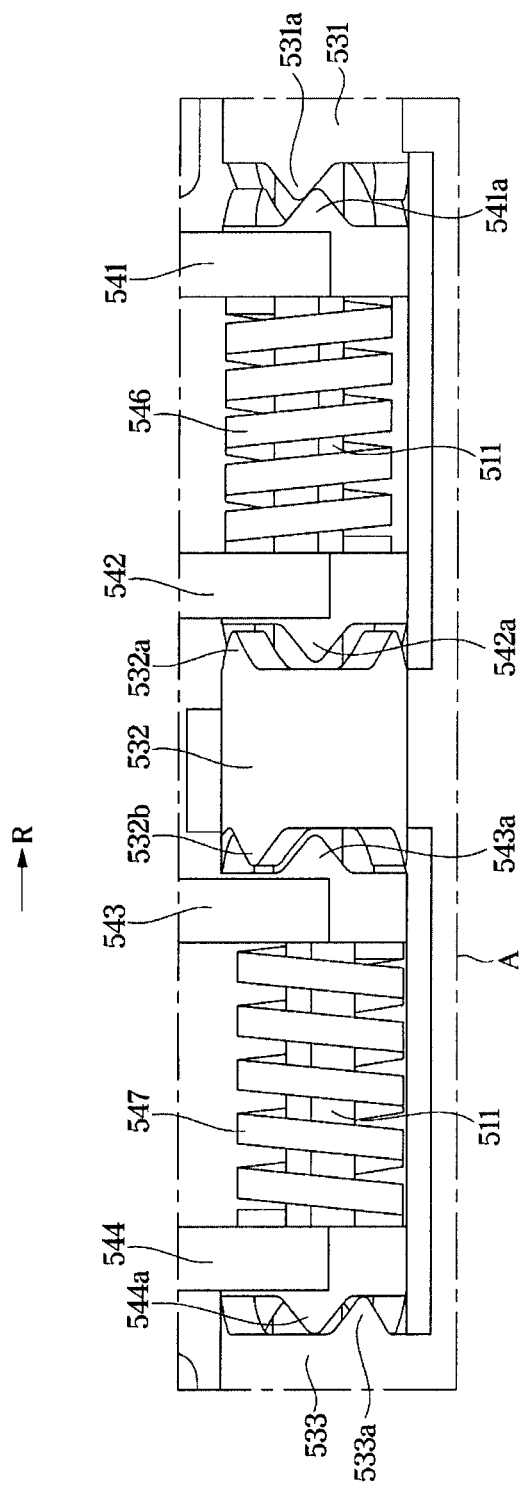
FIG. 8 is an enlarged view of part A shown in FIG. 7.
Figure 9:
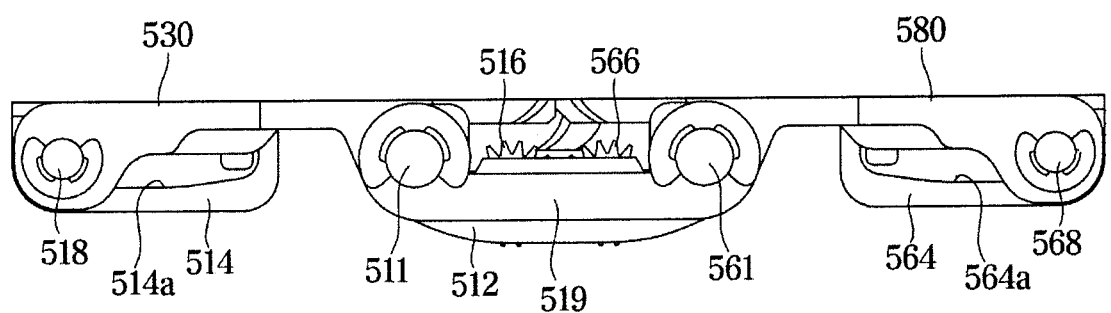
FIG. 9 is a side view illustrating the unfolded state of the hinge structure provided in the electronic device according to certain embodiments of the disclosure.

FIG. 7 is a rear view illustrating an unfolded state of the hinge structure provided in the electronic device according to certain embodiments of the disclosure. FIG. 8 is an enlarged view of part A shown in FIG. 7. FIG. 9 is a side view illustrating the unfolded state of the hinge structure provided in the electronic device according to certain embodiments of the disclosure.

Referring to FIGS. 7 to 9, the hinge structure 500 may be set in the unfolded state.

Particularly, as for the components coupled to the first axis shaft 511, the first rotation cam nose 531a of the first rotation cam 531 is disposed as to contact and interact with the first sliding cam nose 541a of the first sliding cam 541. That is, an end of the first rotation cam nose 531a is out of a flat section of the first sliding cam 541 and is in a position proximate to the end of the first sliding cam nose 541a.

At this time, the second rotation cam nose 542a of the second rotation cam 532 is in a position in which the second rotation cam nose 532a does not come into contact so as not to interact with the second sliding cam nose 542a of the second sliding cam 542. The third rotation cam nose 532b of the second rotation cam 532 is in a position in which the third rotation cam nose 532b does not come into contact so as not to interact with the third sliding cam nose 543a of the third sliding cam 543. The fourth rotation cam nose 533a of the third rotation cam 533 is in a position in which the fourth rotation cam nose 533a does not come into contact so as not to interact with the fourth sliding cam nose 544a of the fourth sliding cam 544. That is, the end of the second rotation cam nose 532a is spaced apart from the second sliding cam nose 542a and is located in a flat section of the second sliding cam 542. The end of the third rotation cam nose 532b is spaced apart from the third sliding cam nose 543a and is located in a flat section of the third sliding cam 543. The end of the fourth rotation cam nose 533a is spaced apart from the fourth sliding cam nose 544a and is located in a flat section of the fourth sliding cam 544.

The first elastic member 546 may apply a force to the first sliding cam 541 in a direction in which the first sliding cam 541 moves away from the second sliding cam 542 (i.e., R-direction in FIG. 7). That is, the first sliding cam 541 receives a force in a direction proximate to the first rotation cam 531. Accordingly, the first rotation cam nose 531a receives a force causing it to move to a position, in which the end of the first rotation cam nose 531a is moved away from the end of the first sliding cam nose 541a so as not to interact with the first sliding cam nose 541a (e.g., in FIG. 7, the first rotation cam nose 531a in contact with an upper surface of the first sliding cam nose 541a receives a force that is to move further upward toward the flat section of the first sliding cam 541). That is, the first rotation cam 531 receives a force along a direction in which the first housing 310 and the second housing 320 unfolded relative to each other.

In this case, the first housing coupling portion 514 coupled to the first cam body 530 is in a state, in which, during rotation in a direction as to unfold the device (e.g., in FIG. 7, the first rotation cam nose 531a in contact with the upper surface of the first sliding cam nose 541a is rotated in a direction of moving further upward toward the flat section of the first sliding cam 541) is limited by the hinge body 512, and thus the rotation of the first rotation cam 531 for separating the first housing 310 and the second housing 320 into the unfolded state is limited. That is, in the first rotation cam 531, an elastic force received from the first elastic member 546 and a force supported by the hinge body 512 are balanced, and thus the first rotation cam nose 531a may maintain a position with respect to the first sliding cam nose 541a.

The sliding cams 591, 592, 593, and 594 coupled to the second axis shaft 561 and the rotation cams 581, 582, and 583 engaged therewith are operated in the same manner as the above-mentioned sliding cams 541, 542, 543, and 544 coupled to the first axis shaft 511 and the rotation cams 531, 532, and 533 engaged therewith, and thus a detailed description thereof will be omitted.

Figure 10:
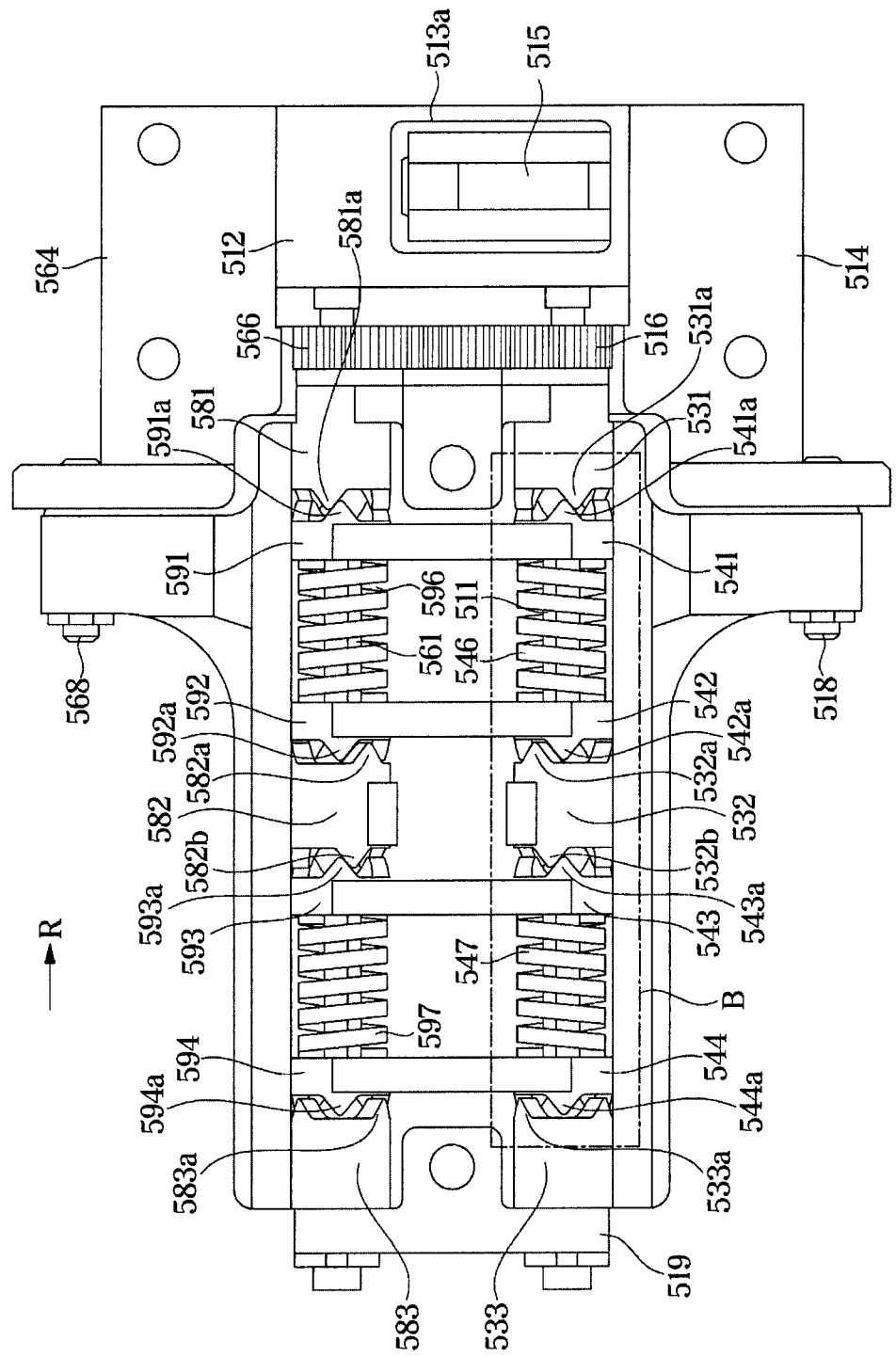
FIG. 10 is a rear view illustrating a state in which the hinge structure provided in the electronic device is fixed at a first angle according to certain embodiments of the disclosure.
Figure 11:
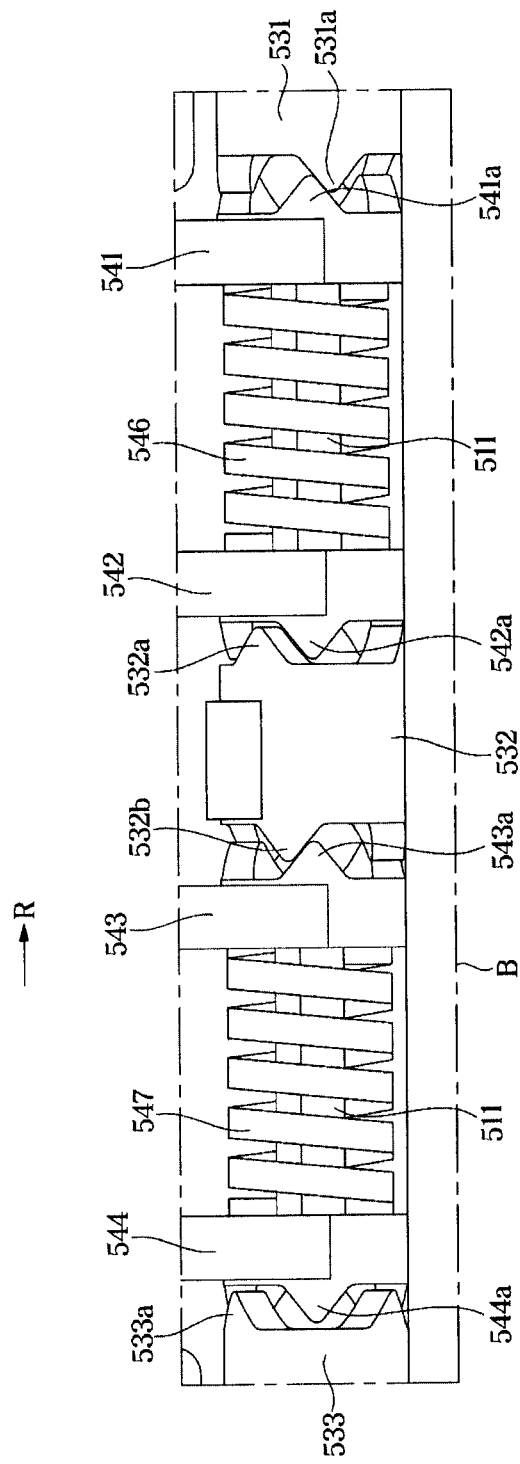
FIG. 11 is an enlarged view of part B shown in FIG. 10.
Figure 12:
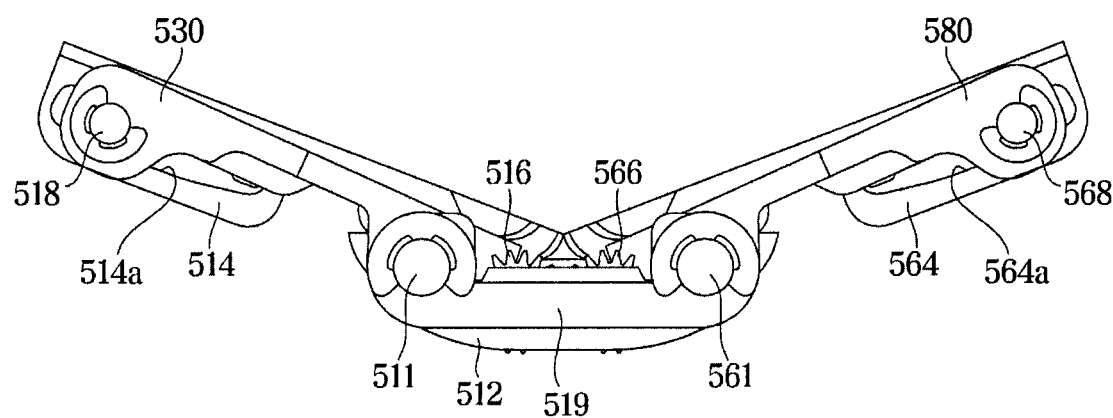
FIG. 12 is a side view illustrating the state in which the hinge structure provided in the electronic device is fixed at the first angle according to certain embodiments of the disclosure.

FIG. 10 is a rear view illustrating a state in which the hinge structure provided in the electronic device is fixed at a first angle according to certain embodiments of the disclosure. FIG. 11 is an enlarged view of part B shown in FIG. 10. FIG. 12 is a side view illustrating the state in which the hinge structure provided in the electronic device is fixed at the first angle according to certain embodiments of the disclosure.

Referring to FIGS. 10 to 12, the hinge structure 500 may be fixed at a position in which the first housing 310 and the second housing 320 form approximately a 130° angle. The angle shown in FIG. 10 may be referred to as a first angle.

Particularly, the first rotation cam nose 531a of the first rotation cam 531 may cross the end of the first sliding cam nose 541a of the first sliding cam 541, and may be moved in the opposite direction (e.g., in the case of the first rotation cam nose 531a in contact with the upper surface of the first sliding cam nose 541a in FIG. 7, it is downward). Because the first elastic member 546 applies a force in a direction in which the first sliding cam 541 moves away from the second sliding cam 542, the first sliding cam 541 may receive a force having directionality towards the first rotation cam 531 (R-direction in FIG. 10). That is, the first rotation cam nose 531a receives a force having directionality pointing away from the end of the first sliding cam nose 541a. That is, the first rotation cam 531 may receive a force in the direction in which the first housing 310 and the second housing 320 are folded (a direction in which the first rotation cam nose 531a in contact with a lower surface of the first sliding cam nose 541a in FIG. 10 is further moved downward).

On the other hand, the third rotation cam nose 532b of the second rotation cam 532 may be disposed in a position of contacting and interacting with the third sliding cam nose 543a of the third sliding cam 543. At this time, because the second elastic member 547 presses the third sliding cam 543 in a direction away from the fourth sliding cam 544, the third rotation cam nose 532b may receive a force in a direction away from the third sliding cam nose 543a. That is, the second rotation cam 532 receives a force in the direction by which the first housing 310 and the second housing 320 are unfolded (a direction in which the third rotation cam nose 532b in contact with the upper surface of the third sliding cam nose 543a in FIG. 10 is moved further upwards).

That is, when described based on the components located below in FIG. 10, because the first rotation cam nose 531a is located below the first sliding cam nose 541a and the third rotation cam nose 532b is located above the third sliding cam nose 543a, the rotational force applied to the first cam body 530 may be balanced. Accordingly, the positions of the first housing 310 and the second housing 320 may be fixed without unfolding or folding.

The second rotation cam nose 532a of the second rotation cam 532 and the second sliding cam nose 542a of the second sliding cam 542 are located in positions in which the second rotation cam nose 532a and the second sliding cam nose 542a are not in contact with each other and do not interact with each other. That is, the second rotation cam nose 532a is positioned in a flat section of the second sliding cam 542, and the second sliding cam nose 542a is positioned in a flat section of the second rotation cam 532.

The fourth rotation cam nose 533a of the third rotation cam 533 and the fourth sliding cam nose 544a of the fourth sliding cam 544 are located in positions in which the fourth rotation cam nose 533a and the fourth sliding cam nose 544a are not in contact with each other and do not interact with each other. That is, the fourth rotation cam nose 533a is positioned in a flat section of the fourth sliding cam 544, and the fourth sliding cam nose 544a is positioned in the flat section of the second rotation cam 532.

In response to rotation of the first cam body 530, the first sliding shaft 518 slides along the guide slit 514a of the first housing coupling portion 514, and the first coupling portion guide 515 is guided by the first body guide 513a. Accordingly, the first housing coupling portion 514 is rotated and moved in a direction in which the first region 201 and the second region 202 of the display 200 face each other.

The sliding cams 591, 592, 593, and 594 coupled to the second axis shaft 561 and the rotation cams 581, 582, and 583 engaged therewith are operated in the same manner as the above-mentioned sliding cams 541, 542, 543, and 544 coupled to the first axis shaft 511 and the rotation cams 531, 532, and 533 engaged therewith, and thus a detailed description thereof will be omitted.

Figure 13:
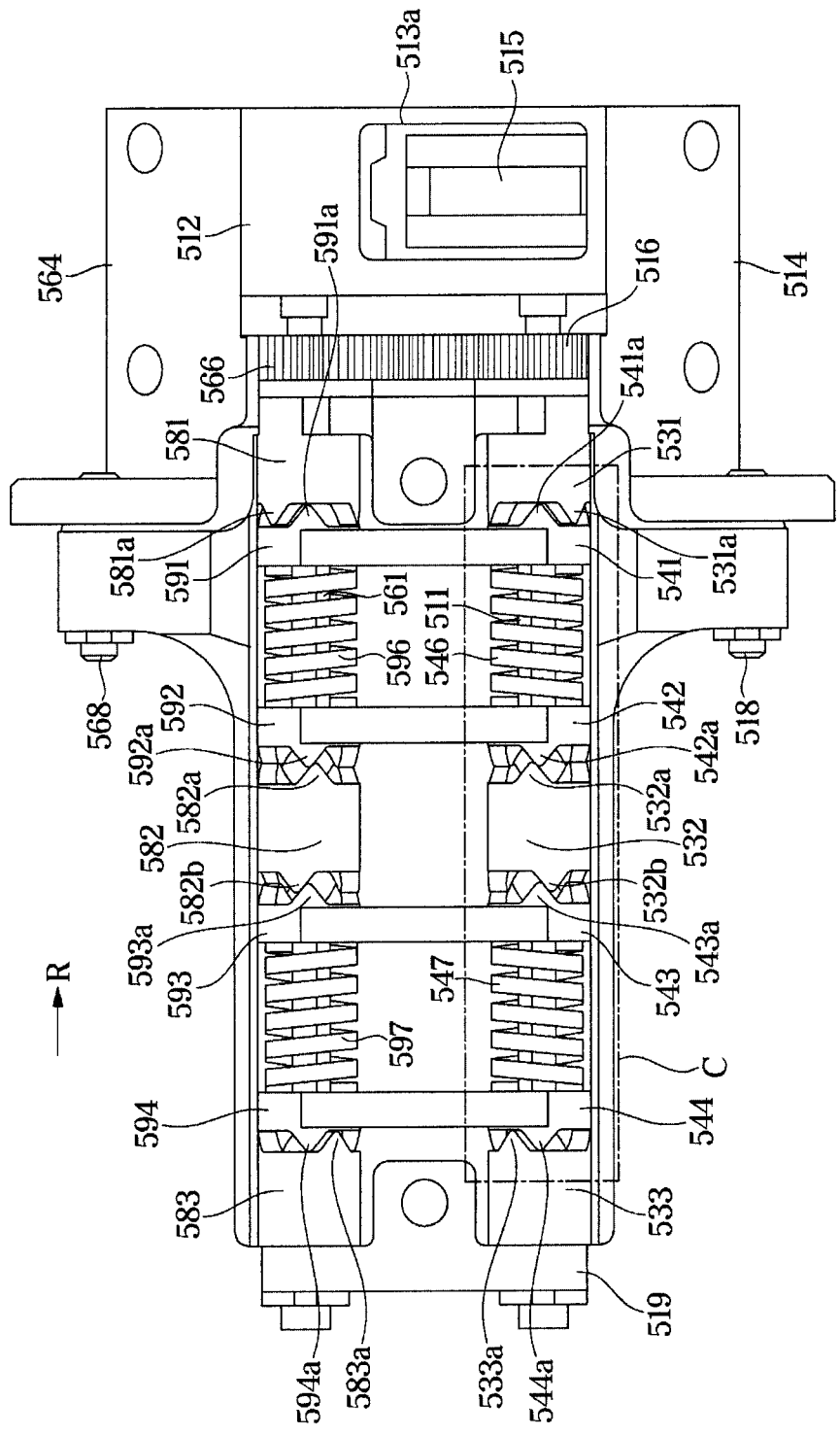
FIG. 13 is a rear view illustrating a state in which the hinge structure provided in the electronic device is fixed at a second angle according to certain embodiments of the disclosure.
Figure 14:
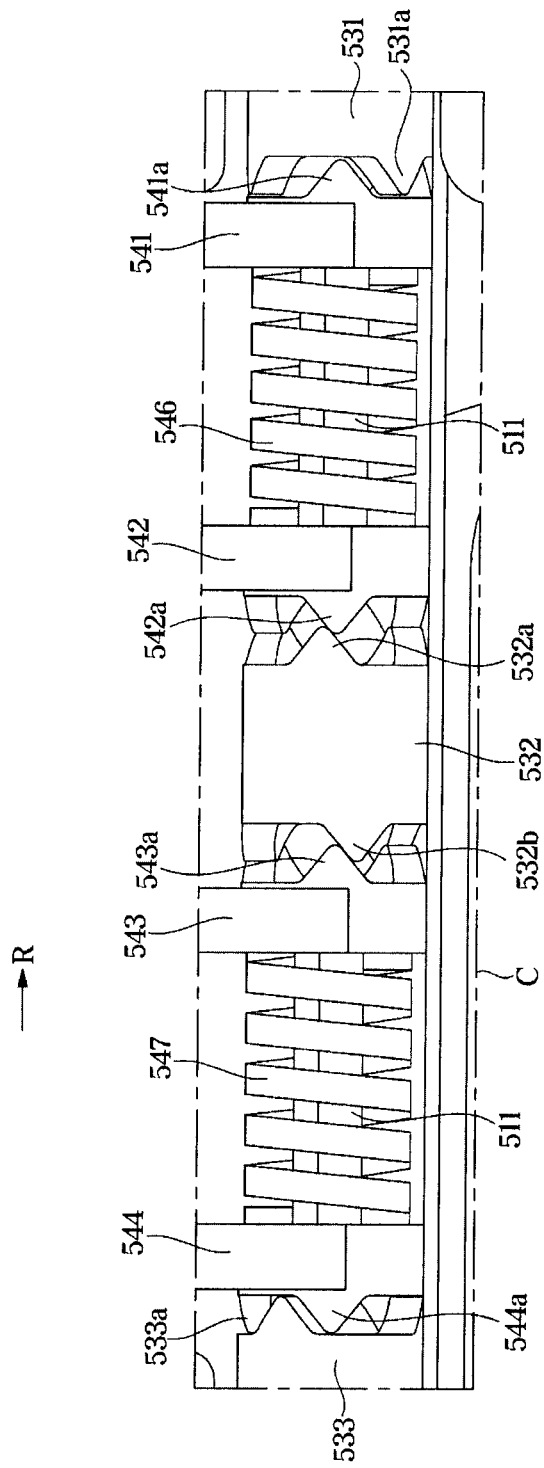
FIG. 14 is an enlarged view of part C shown in FIG. 13.
Figure 15:
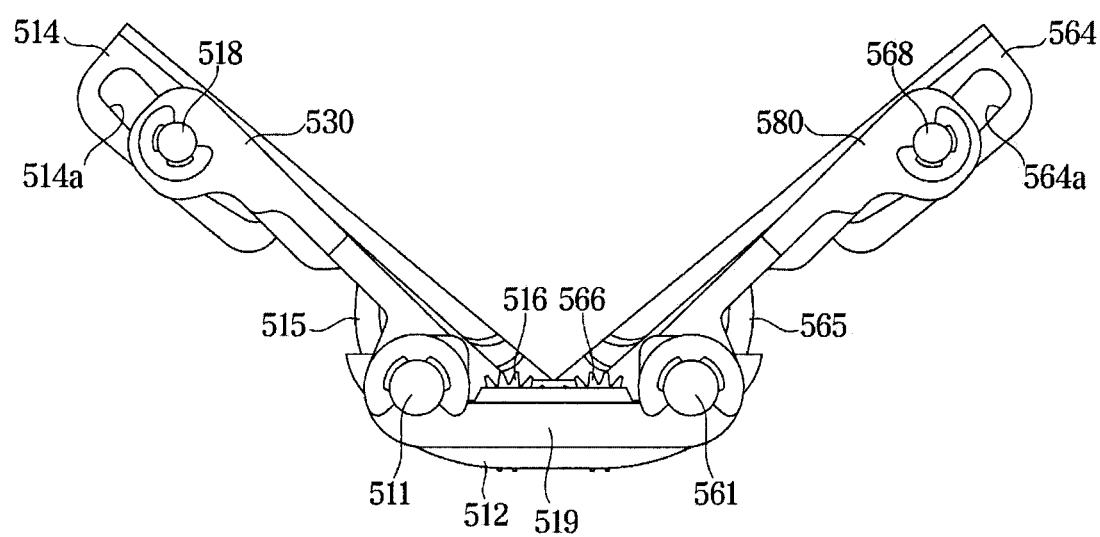
FIG. 15 is a side view illustrating the state in which the hinge structure provided in the electronic device is fixed at the second angle according to certain embodiments of the disclosure.

FIG. 13 is a rear view illustrating a state in which the hinge structure provided in the electronic device is fixed at a second angle according to certain embodiments of the disclosure. FIG. 14 is an enlarged view of part C shown in FIG. 13. FIG. 15 is a side view illustrating the state in which the hinge structure provided in the electronic device is fixed at the second angle according to certain embodiments of the disclosure.

Referring to FIGS. 13 to 15, the hinge structure 500 may be fixed at a position in which an angle between the first housing 310 and the second housing 320 forms approximately 90°. The angle shown in FIG. 13 may be referred to as a second angle.

Particularly, the first rotation cam nose 531a is moved to a position in which the first rotation cam nose 531a is not in contact with and does not interact with the first sliding cam nose 541a. At the same time, the second rotation cam nose 532a is moved to a position of contacting and interacting with the second sliding cam nose 542a. That is, the second rotation cam nose 532a is out of the flat section of the second sliding cam 542 and is in a position close to the end of the second sliding cam nose 542a. Accordingly, referring to FIG. 13, the first sliding cam 541, the second sliding cam 542, and the first elastic member 546 are moved together in the R-direction. Because the first elastic member 546 applies a force in a direction in which the second sliding cam 542 is away from the first sliding cam 541, the second sliding cam 542 receives a force in a direction closer to the second rotation cam 532. Accordingly, the second rotation cam nose 532a receives a force in a direction away from the end of the second sliding cam nose 542a. That is, referring to FIG. 13, the second rotation cam nose 532a in contact with the upper surface of the second sliding cam nose 542a receives a force in a direction of moving further upward (a direction in which the first housing 310 and the second housing 320 are unfolded).

Meanwhile, the third rotation cam nose 532b crosses the end of the third sliding cam nose 543a and is moved to the opposite direction. That is, the third rotation cam nose 532b in contact with the upper surface of the third sliding cam nose 543a as shown in FIG. 10 is moved to contact a lower surface of the third sliding cam nose 543a as shown in FIG. 13. Because the second elastic member 547 applies a force in a direction in which the third sliding cam 543 is moved away from the fourth sliding cam 544, the third sliding cam 543 receives a force in a direction closer to the second rotation cam 532. Accordingly, the third rotation cam nose 532b receives a force in a direction away from the end of the third sliding cam nose 543a (the direction in which the first housing 310 and the second housing 320 are folded).

That is, when described based on the components located below in FIG. 13, because the second rotation cam nose 532a is located on the upper surface of the second sliding cam nose 542a and the third rotation cam nose 532b is located on the lower surface of the third sliding cam nose 543a, the rotational force applied to the first cam body 530 is balanced. Accordingly, the positions of the first housing 310 and the second housing 320 may be fixed without folding or unfolding.

The fourth rotation cam nose 533a of the third rotation cam 533 is located in a position in which the fourth rotation cam nose 533a is not in contact with and does not interact with the fourth sliding cam nose 544a. That is, the fourth rotation cam nose 533a is positioned in a flat section of the fourth sliding cam 544.

In response to rotation of the first cam body 530, the first sliding shaft 518 slides along the guide slit 514a of the first housing coupling portion 514, and the first coupling portion guide 515 is guided by the first body guide 513a. Accordingly, the first housing coupling portion 514 is rotated and moved in a direction in which the hinge cover 330 is exposed.

The sliding cams 591, 592, 593, and 594 coupled to the second axis shaft 561 and the rotation cams 581, 582, and 583 engaged therewith are operated in the same manner as the above-mentioned sliding cams 541, 542, 543, and 544 coupled to the first axis shaft 511 and the rotation cams 531, 532, and 533 engaged therewith, and thus a detailed description thereof will be omitted.

Figure 16:
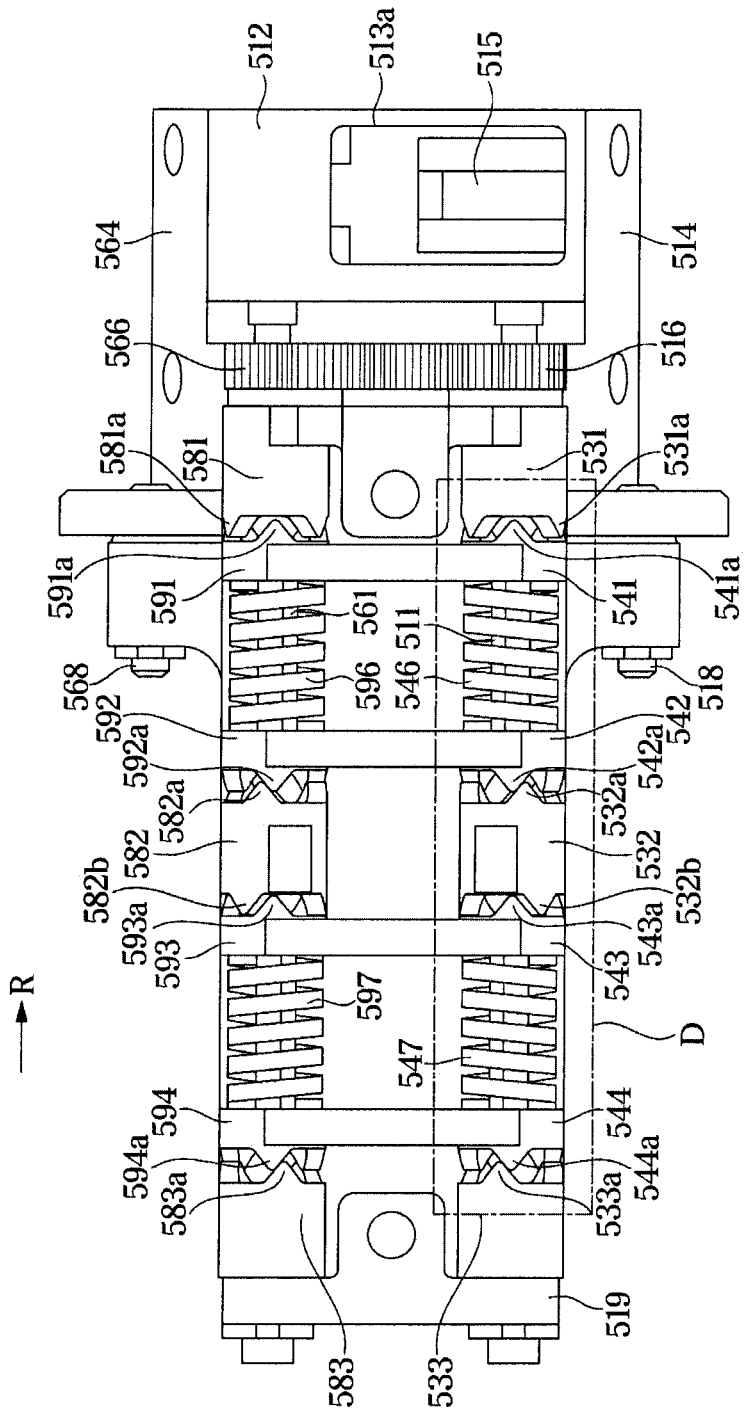
FIG. 16 is a rear view illustrating a state in which the hinge structure provided in the electronic device is fixed at a third angle according to certain embodiments of the disclosure.
Figure 17:
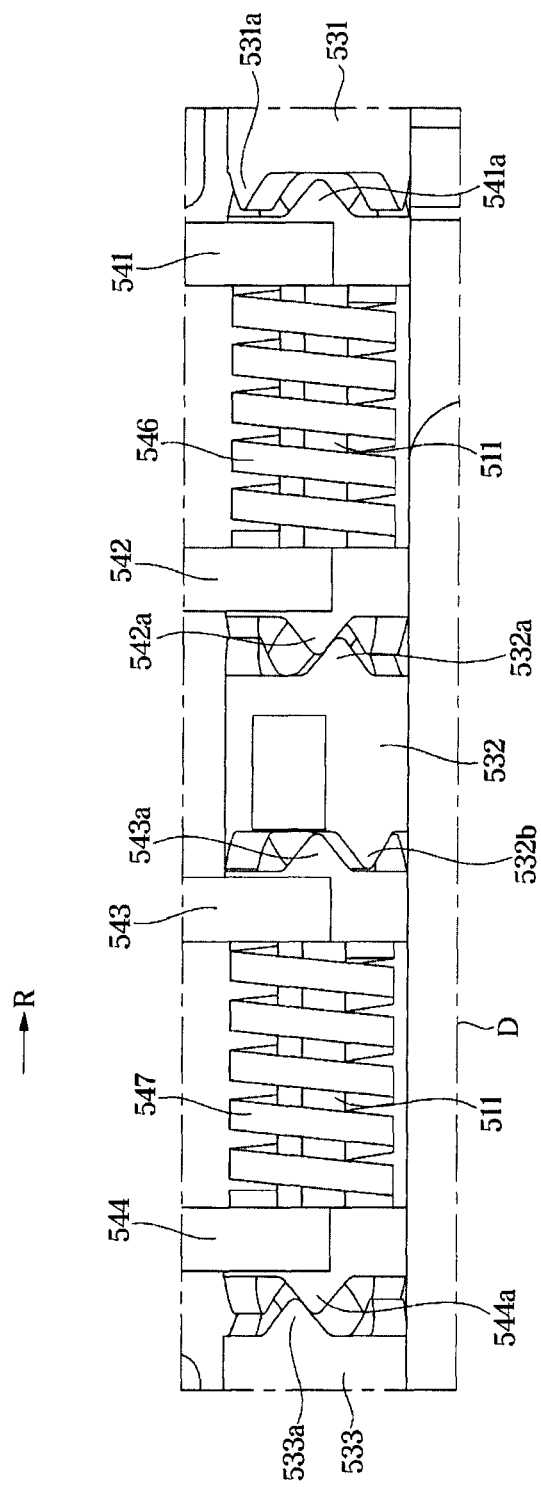
FIG. 17 is an enlarged view of part D shown in FIG. 16.
Figure 18:
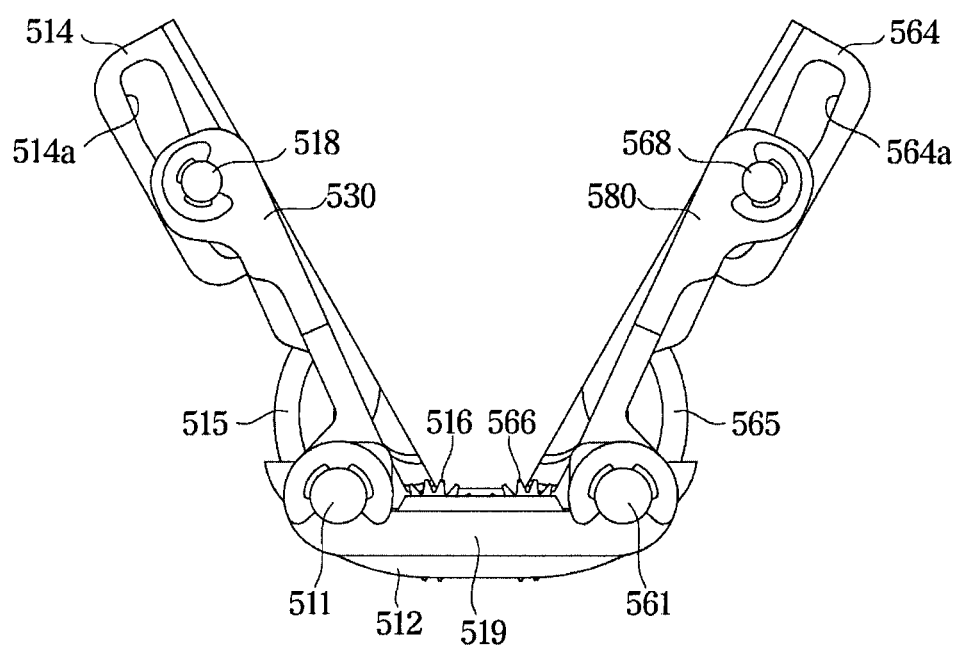
FIG. 18 is a side view illustrating the state in which the hinge structure provided in the electronic device is fixed at the third angle according to certain embodiments of the disclosure.

FIG. 16 is a rear view illustrating a state in which the hinge structure provided in the electronic device is fixed at a third angle according to certain embodiments of the disclosure. FIG. 17 is an enlarged view of part D shown in FIG. 16. FIG. 18 is a side view illustrating the state in which the hinge structure provided in the electronic device is fixed at the third angle according to certain embodiments of the disclosure.

Referring to FIGS. 16 to 18, the hinge structure 500 may be fixed at a position in which an angle between the first housing 310 and the second housing 320 forms approximately 50°. The angle shown in FIG. 13 may be referred to as a third angle.

Particularly, the third rotation cam nose 532b is moved to a position in which the third rotation cam nose 532b is not in contact with and does not interact with the third sliding cam nose 543a. At the same time, the fourth rotation cam nose 533a is moved to a position of contacting and interacting with the fourth sliding cam nose 544a. That is, the fourth rotation cam nose 533a is out of the flat section of the fourth sliding cam 544 and is in a position close to the end of the fourth sliding cam nose 544a. Accordingly, referring to FIG. 16, the fourth sliding cam 544, the third sliding cam 543, and the second elastic member 547 are moved together in the R-direction. Because the second elastic member 547 applies a force in a direction in which the fourth sliding cam 544 is away from the third sliding cam 543, the fourth sliding cam 544 receives a force in a direction closer to the third rotation cam 533. Accordingly, the fourth rotation cam nose 533a receives a force in a direction away from the end of the fourth sliding cam nose 544a. That is, referring to FIG. 16, the fourth rotation cam nose 533a in contact with the upper surface of the fourth sliding cam nose 544a receives a force in a direction of moving further upward (the direction in which the first housing 310 and the second housing 320 are unfolded).

Meanwhile, the second rotation cam nose 532a crosses the end of the second sliding cam nose 542a and is moved to the opposite direction. That is, the second rotation cam nose 532a in contact with the upper surface of the second sliding cam nose 542a as shown in FIG. 13 is moved to contact the lower surface of the second sliding cam nose 542a, as shown in FIG. 16. Because the first elastic member 546 applies a force in a direction in which the second sliding cam 542 is away from the first sliding cam 541, the second sliding cam 542 receives a force in a direction closer to the second rotation cam 532. Accordingly, the second rotation cam nose 532a receives a force in a direction away from the end of the second sliding cam nose 542a (the direction in which the first housing 310 and the second housing 320 are folded).

That is, when described based on the components located below in FIG. 16, because the second rotation cam nose 532a is located on the lower surface of the second sliding cam nose 542a and the fourth rotation cam nose 533a is located on the upper surface of the fourth sliding cam nose 544a, the rotational force applied to the first cam body 530 is balanced. Accordingly, the positions of the first housing 310 and the second housing 320 may be fixed without folding or unfolding.

The first rotation cam nose 531a of the first rotation cam 531 is located in a position in which the first rotation cam nose 531a is not in contact with and does not interact with the first sliding cam nose 541a of the first sliding cam 541. That is, the first rotation cam nose 531a is positioned in a flat section of the first sliding cam 541.

In response to rotation of the first cam body 530, the first sliding shaft 518 slides along the guide slit 514a of the first housing coupling portion 514, and the first coupling portion guide 515 is guided by the first body guide 513a. Accordingly, the first housing coupling portion 514 is rotated and moved in a direction in which the hinge cover 330 is exposed.

The sliding cams 591, 592, 593, and 594 coupled to the second axis shaft 561 and the rotation cams 581, 582, and 583 engaged therewith are operated in the same manner as the above-mentioned sliding cams 541, 542, 543, and 544 coupled to the first axis shaft 511 and the rotation cams 531, 532, and 533 engaged therewith, and thus a detailed description thereof will be omitted.

Figure 19:
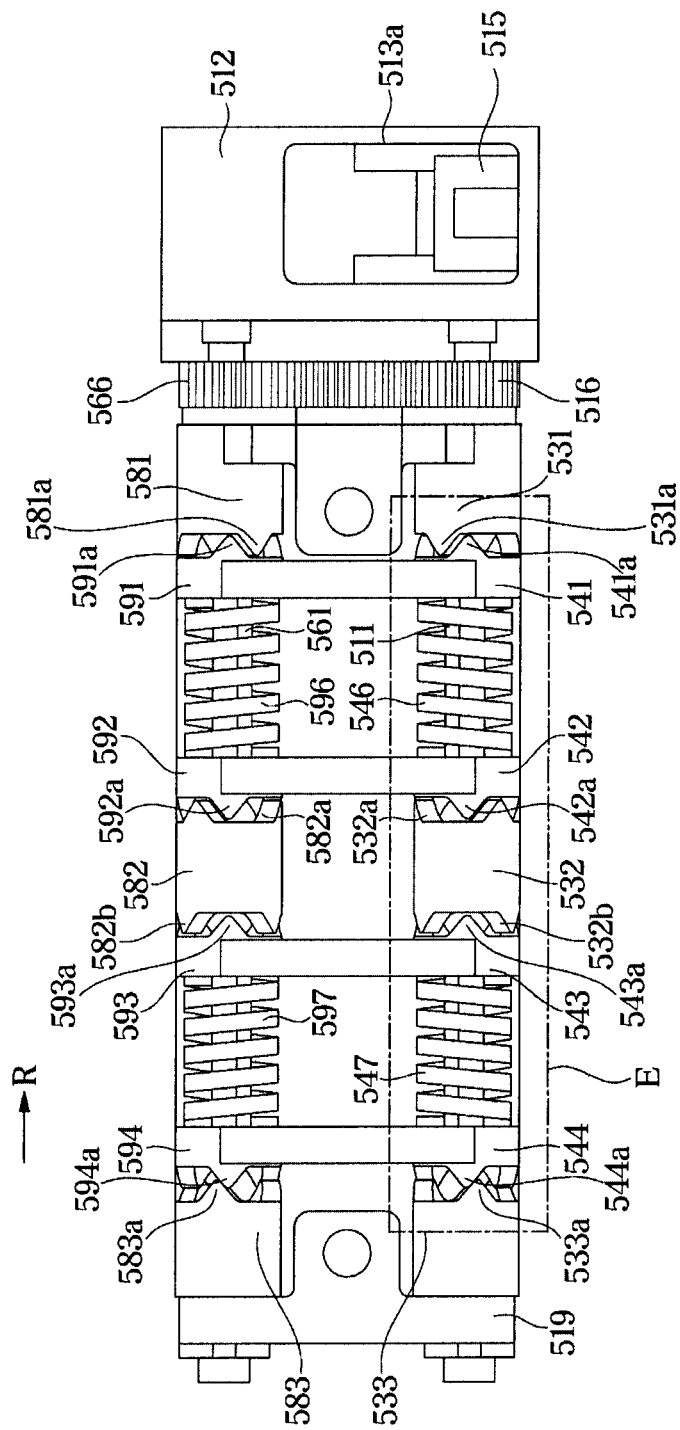
FIG. 19 is a rear view illustrating a folded state of the hinge structure provided in the electronic device according to certain embodiments of the disclosure.
Figure 20:
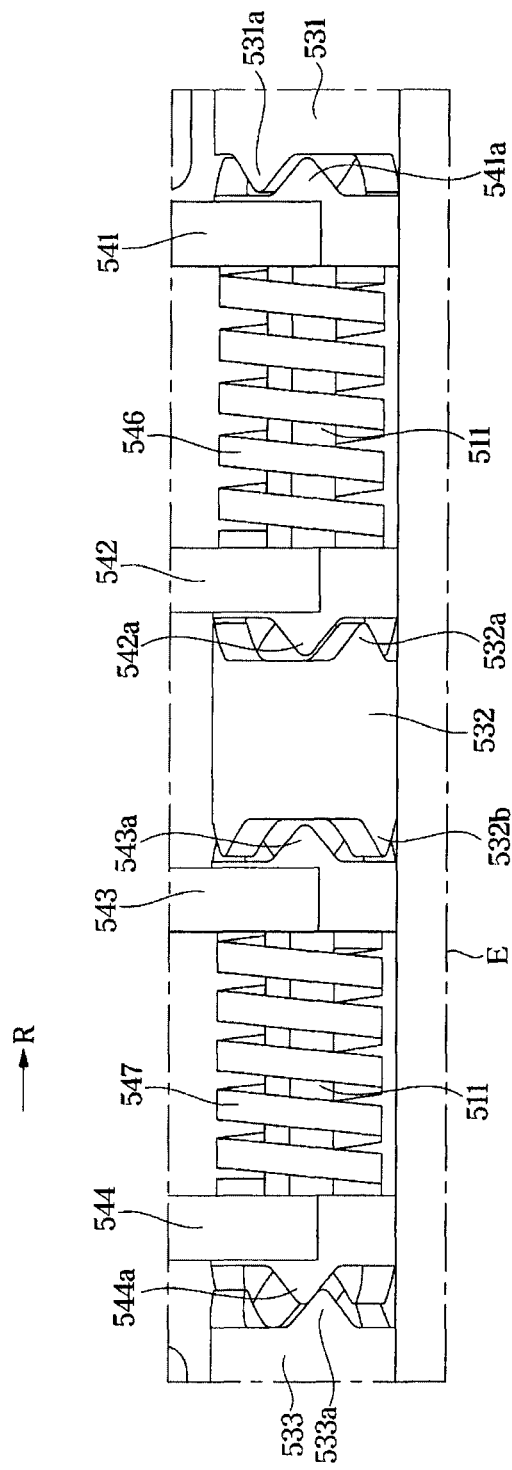
FIG. 20 is an enlarged view of part E shown in FIG. 19.
Figure 21:
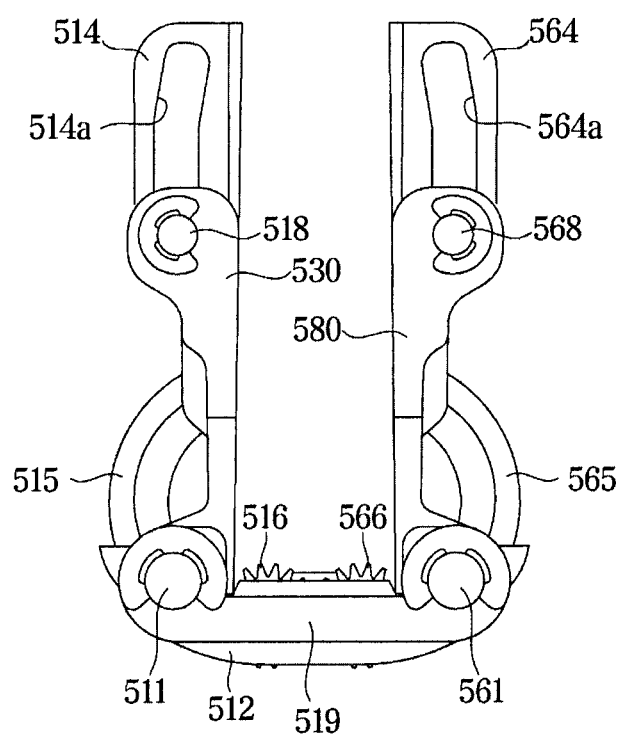
FIG. 21 is a side view illustrating the folded state of the hinge structure provided in the electronic device according to certain embodiments of the disclosure.

FIG. 19 is a rear view illustrating a folded state of the hinge structure provided in the electronic device according to certain embodiments of the disclosure. FIG. 20 is an enlarged view of part E shown in FIG. 19. FIG. 21 is a side view illustrating the folded state of the hinge structure provided in the electronic device according to certain embodiments of the disclosure.

Referring to FIGS. 19 to 21, the hinge structure 500 may be fixed in the state in which the first housing 310 and the second housing 320 are folded.

Particularly, the second rotation cam nose 532a is moved to a position in which the second rotation cam nose 532a is not in contact with and does not interact with the second sliding cam nose 542a. That is, the second rotation cam nose 532a is positioned in a flat section of the second sliding cam 542.

The fourth rotation cam nose 533a may cross the end of the fourth sliding cam nose 544a and is moved to the opposite direction. That is, the fourth rotation cam nose 533a may be in contact with the upper surface of the fourth sliding cam nose 544a as shown in FIG. 16, and may be moved to contact the lower surface of the fourth sliding cam nose 544a, as shown in FIG. 19. Because the second elastic member 547 applies a force in a direction in which the fourth sliding cam 544 is moved away from the third sliding cam 543, the fourth sliding cam 544 receives a force in a direction coming closer to the fourth rotation cam 533. Accordingly, the fourth rotation cam nose 533a receives a force in a direction away from the end of the fourth sliding cam nose 544a (the direction in which the first housing 310 and the second housing 320 are folded).

In this case, because of the limitation imposed on the first housing coupling portion 514 coupled to the first cam body 530 being rotated towards the folding direction, by the hinge body 512, the rotational force applied to the first cam body 530 is balanced and the first housing 310 and the second housing 320 do not rotate and maintain positions thereof.

In response to rotation of the first cam body 530, the first sliding shaft 518 may slide along the guide slit 514a of the first housing coupling portion 514, and the first coupling portion guide 515 is guided by the first body guide 513a. Accordingly, the first housing coupling portion 514 is rotated and moved in a direction in which the first region 201 and the second region 202 of the display 200 are closed to each other.

The sliding cams 591, 592, 593, and 594 coupled to the second axis shaft 561 and the rotation cams 581, 582, and 583 engaged therewith are operated in the same manner as the above-mentioned sliding cams 541, 542, 543, and 544 coupled to the first axis shaft 511 and the rotation cams 531, 532, and 533 engaged therewith, and thus a detailed description thereof will be omitted.

As is apparent from the above description, because a foldable flexible display device and an electronic device are configured such that a plurality of rotation cams and a plurality of sliding cams are coupled in various combinations, it is possible set various angles between a first housing and a second housing so as to implement stable fixation.

According to certain embodiments, each component (e.g., a module or a program) of the above-described components may include a singular or a plurality of entities, and some of the plurality of entities may be separately arranged in other components. According to certain embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. Operations performed by a module, a program module, or other elements according to certain embodiments of the present disclosure may be executed sequentially, in parallel, repeatedly, or in a heuristic method. Also, a portion of operations may be executed in different sequences, omitted, or other operations may be added.

Although a few embodiments of the disclosure have been shown and described, it would be appreciated by those skilled in the art that changes may be made in these embodiments without departing from the principles of the disclosure, the scope of which is defined in the claims and their equivalents.

What is claimed is:

1. An electronic device, comprising:
a flexible display including a first region and a second region;
a first housing supporting the first region;
a second housing supporting the second region; and
a hinge structure connecting the first housing to the second housing, w % herein the hinge structure comprises:
an axis shaft forming a rotational axis;
a sliding cam slidably coupled to the axis shaft, and including a first sliding cam in which a first sliding cam nose is formed, a second sliding cam in which a second sliding cam nose is formed, a third sliding cam in which a third sliding cam nose is formed, and a fourth sliding cam in which a fourth sliding cam nose is formed;
a cam body including a first rotation cam including a first rotation cam nose engaged with the first sliding cam, a second rotation cam including a second rotation cam nose engaged with the second sliding cam and a third rotation cam nose engaged with the third sliding, and a third rotation cam including a fourth rotation cam nose engaged with the fourth sliding cam; and
elastic members including a first elastic member disposed between the first sliding cam and the second sliding cam, and a second elastic member disposed between the third sliding cam and the fourth sliding cam,
wherein the first rotation cam nose, the second rotation cam nose, the third rotation cam nose, and the fourth rotation cam nose are disposed on different imaginary lines extending parallel to the rotational axis of the axis shaft.

2. The electronic device of claim 1, wherein:
the first sliding cam nose, the second sliding cam nose, the third sliding cam nose, and the fourth sliding cam nose are disposed on a same imaginary line.

3. The electronic device of claim 1, wherein:
the first elastic member applies an elastic force to the first sliding cam and the second sliding cam, along a direction in which the first sliding cam is movable away from the second sliding cam; and
the second elastic member applies an elastic force to the third sliding cam and the fourth sliding cam, along a direction in which the third sliding cam is movable away from the fourth sliding cam.

4. The electronic device of claim 1, wherein:
the cam body is rotatable together with the axis shaft.

5. The electronic device of claim 1, wherein:
when the first housing and the second housing are disposed at a first angle relative to one another, the first rotation cam is configured to receive a rotational force in a first direction by the first elastic member and the first sliding cam, and the third rotation cam is configured to receive a rotational force in a second direction opposite to the first direction by the second elastic member and the third sliding cam.

6. The electronic device of claim 5, wherein:
when the first housing and the second housing are disposed at a second angle relative to one another, the second rotation cam is configured to receive a rotational force in the second direction by the first elastic member and the second sliding cam, and the third rotation cam is configured to receive a rotational force in the first direction by the second elastic member and the third sliding cam.

7. The electronic device of claim 6, wherein:
when the first housing and the second housing are disposed at a third angle relative to one another, the second rotation cam is configured to receive a rotational force in the first direction by the first elastic member and the second sliding cam, and the fourth rotation cam is configured to receive a rotational force in the second direction by the second elastic member and the fourth sliding cam.

8. The electronic device of claim 7, wherein:
the first angle is greater than the second angle, and the second angle is greater than the third angle.

9. The electronic device of claim 7, wherein:
when the first housing and the second housing are rotated to an angle between the first angle and the second angle, the first sliding cam, the second sliding cam, and the first elastic member are moved along a direction in which the axis shaft extends.

10. The electronic device of claim 7, wherein:
when the first housing and the second housing are rotated to an angle between the second angle and the third angle, the third sliding cam, the fourth sliding cam, and the second elastic member are moved along a direction in which the axis shaft extends.

11. The electronic device of claim 1, wherein:
when the first housing and the second housing are disposed in an unfolded configuration, the first rotation cam nose is supported on the first sliding cam nose by the first elastic member, in a direction along which the first housing and the second housing unfold relative to one another.

12. The electronic device of claim 1, wherein:
when the first housing and the second housing are disposed in an folded configuration, the fourth rotation cam nose is supported on the fourth sliding cam nose by the second elastic member, in a direction along which the first housing and the second housing fold together.

13. A foldable flexible display device, comprising:
a first housing;
a second housing;
a flexible display disposed on the first housing and the second housing; and
a hinge structure provided to rotatably couple the first housing to the second housing, wherein the hinge structure comprises:
an axis shaft forming a rotational axis;
a sliding cam slidably coupled to the axis shaft, and including a first sliding cam in which a first sliding cam nose is formed, a second sliding cam in which a second sliding cam nose is formed, a third sliding cam in which a third sliding cam nose is formed, and a fourth sliding cam in which a fourth sliding cam nose is formed; and
a cam body including a first rotation cam engaged with the first sliding cam and including a first rotation cam nose, a second rotation cam engaged with the second sliding cam and the third sliding cam, and including a second rotation cam nose and a third rotation cam nose, and a third rotation cam engaged with the fourth sliding cam and including a fourth rotation cam nose,
wherein the first sliding cam nose, the second sliding cam nose, the third sliding cam nose, and the fourth sliding cam nose are disposed on a same imaginary line; and
wherein the first rotation cam nose, the second rotation cam nose, the third rotation cam nose, and the fourth rotation cam nose are disposed on different imaginary lines extending parallel to the rotational axis of the axis shaft.

14. The foldable flexible display device of claim 13, wherein:
when an angle between the first housing and the second housing is a first angle, the first rotation cam is supported in a first direction by the first sliding cam, and the third rotation cam is supported in a second direction opposite to the first direction by the third sliding cam.

15. The foldable flexible display device of claim 14, wherein:
when an angle between the first housing and the second housing is a second angle, the second rotation cam is supported in the second direction by the second sliding cam, and the third rotation cam is supported in the first direction by the third sliding cam.

16. The foldable flexible display device of claim 15, wherein:
when an angle between the first housing and the second housing is a third angle, the second rotation cam is supported in the first direction by the second sliding cam, and the fourth rotation cam is supported in the second direction by the fourth sliding cam.

17. The foldable flexible display device of claim 13, wherein:
the hinge structure includes a first elastic member disposed between the first sliding cam and the second sliding cam, and a second elastic member disposed between the third sliding cam and the fourth sliding cam.

18. The foldable flexible display device of claim 13, wherein:
when the first housing and the second housing are disposed in an unfolded configuration, the first rotation cam is supported by the first sliding cam, along a direction in which the first housing and the second housing unfold relative to one another.

19. The foldable flexible display device of claim 13, wherein:
when the first housing and the second housing are disposed in a folded configuration, the fourth rotation cam is supported by the fourth sliding cam, along a direction, in which the first housing and the second housing fold together.

20. The foldable flexible display device of claim 13, wherein:
the second rotation cam nose is formed on a first surface of the second rotation cam facing the second sliding cam, and the third rotation cam nose is formed on a second surface of the second rotation cam opposite to the first surface.

* * * * *